United States Patent [19]

Schwander et al.

[11] 4,236,007

[45] Nov. 25, 1980

[54] NAPHTHOLACTAM DYESTUFFS

[75] Inventors: Hansrudolf Schwander, Riehen; Christian Zickendraht, Binningen, both of Switzerland

[73] Assignee: Ciba-Geigy Aktiengesellschaft, Basel, Switzerland

[21] Appl. No.: 2,512

[22] Filed: Jan. 11, 1979

Related U.S. Application Data

[62] Division of Ser. No. 794,485, May 6, 1977, Pat. No. 4,148,805.

[30] Foreign Application Priority Data

Jun. 1, 1976 [CH] Switzerland ........................ 6859/76

[51] Int. Cl.[3] .................. C07D 401/02; C07C 125/06; C07D 209/04; C07D 413/02

[52] U.S. Cl. .................................... 544/328; 544/331; 548/329; 548/159; 548/126; 548/198; 548/128; 548/138; 548/266; 546/272; 546/108; 546/143; 260/326.11 R

[58] Field of Search ............... 548/329, 159, 126, 198, 548/128, 138, 266; 546/272, 108, 143; 260/326.11 R; 544/328, 331

[56] References Cited

U.S. PATENT DOCUMENTS 4,148,805 4/1979 Schwander et al. ................. 546/143

*Primary Examiner*—Henry R. Jiles

*Assistant Examiner*—Robert C. Whittenbaugh

*Attorney, Agent, or Firm*—Sprung, Felfe, Horn, Lynch & Kramer

[57] ABSTRACT

A dyestuff of the general formula (I)

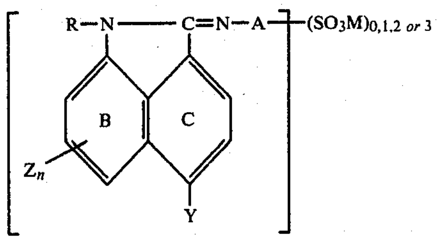

(I)

in which R represents alkyl, alkenyl, cycloalkyl, aralkyl, aryl or, preferably, hydrogen, M represents hydrogen or a cation, Y represents a free or modified carboxyl group, Z represents a non-ionic substituent, n represents 0, 1 or 2, A represents a heterocyclic radical or an aromatic radical having negative substituents and B and C can carry further non-ionic substituents. The dyestuffs give brilliant red and yellow shades on polyester fibers.

8 Claims, No Drawings

NAPHTHOLACTAM DYESTUFFS

This is a division of application Ser. No. 794,485, filed May 6, 1977 now U.S. Pat. No. 4,148,805.

The invention relates to naphtholactam dyestuffs of the general formula (I)

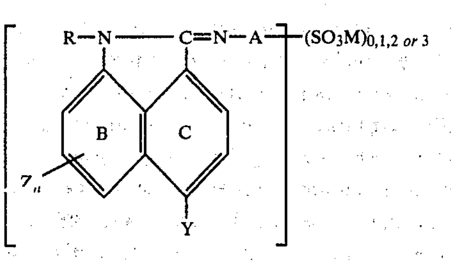

(I)

in which R represents alkyl, alkenyl, cycloalkyl, aralkyl, aryl or, preferably, hydrogen, M represents hydrogen or a cation, Y represents a free or modified carboxyl group, Z represents a non-ionic substituent, n represents 0, 1 or 2, A represents a heterocyclic radical or an aromatic radical having negative substituents and B and C can carry further non-ionic substituents.

The new dyestuffs of the formula (I) can be manufactured by various processes.

A particularly advantageous process consists in subjecting a naphtholactam compound of the formula (II)

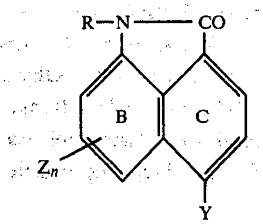

(II)

in whch R, Y, Z, B, C and n have the meaning indicated above, to a condensation reaction, in the presence of an acid condensing agent, preferably phosphorus oxychloride, with an amino compound of the formula $H_2N—A$ (III)

in which A has the same meaning as above, and optionally subsequently sulphonating, brominating, chlorinating, nitrating and/or saponifying the resulting condensation product.

Another of these processes is characterised in that a compound of the formula

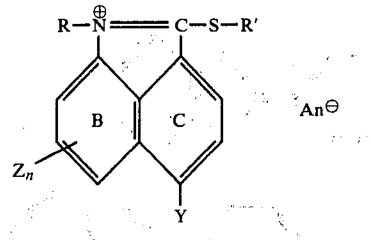

(IV)

in which R' represents a $C_1$–$C_4$-alkyl radical, preferably methyl or ethyl, An represents an anion and R, Z, Y, B, C and n have the meaning indicated above, is subjected to a condensation reaction with a compound of the formula $H_2N—A$ (III)

in which A has the same meaning as above, R'—SH and H—An being split off, and, if desired, the resulting condensation product is sulphonated, brominated, chlorinated, nitrated and/or saponified.

Dyestuffs of the formula (I) in which Y represents —CN, —COCl, —CO—Q or, preferably, —CO—OR$_1$', in which Q is the radical of an amine H—Q and R$_1$' is optionally substituted alkyl, alkenyl, cycloalkyl, aralkyl or aryl or a heterocyclic radical, and A and R have the same meaning as above, are preferred.

In respect of the group A, particularly preferred dyestuffs are derived either from negatively substituted anilines or from the reactive derivatives of benzimidazole, benzoxazole, benzthiazole, pyridine, quinoline, phenanthridine, indolenine, thiadiazole, triazole, pyrimidine and isoquinoline.

Suitable anilines A—$NH_2$ correspond, for example, to the formula

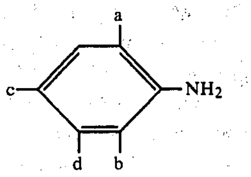

(V)

in which a denotes hydrogen, halogen (for example chlorine and bromine), $C_1$–$C_4$-alkyl, $C_1$–$C_4$-alkoxy, nitro, cyano, $C_1$–$C_4$-alkoxycarbonyl or $C_1$–$C_4$-alkylsulphone, b denotes hydrogen, halogen (for example chlorine or bromine), $C_1$–$C_4$-alkyl, nitro, cyano or trifluoromethyl, c denotes nitro, cyano, carboxyl, $C_1$–$C_4$-alkoxycarbonyl or alkylsulphonyl and d denotes hydrogen, $C_1$–$C_4$-alkyl, $C_1$–$C_4$-alkoxy or $C_1$–$C_4$-alkylmercapto. Particularly preferentially d is H, a is Cl, Br or CN, b is H and c is $NO_2$.

Negatively substituted anilines are anilines which carry negative subtituents, that is to say substituents which intensify the acid characteristics of phenol.

Suitable arylamines are aniline, o-, m- and p-chloroaniline, o-, m- and p-toluidine, o-, m- and p-phenetidine, 1-aminonaphthaline, 2-aminonaphthaline, p-aminobenzoic acid, methyl p-aminobenzoate, 1-amino-2-trifluoromethyl-4-chlorobenzene, 1-amino-2-cyano-4-chlorobenzene, 1-amino-2-carboxyl-4-chlorobenzene, 1-amino-2-carboxyl-4-nitrobenzene, 1-amino-2-chloro-4-cyanobenzene, 1-amino-2-chloro-4-nitrobenzene, 1-amino-2-bromo-4-nitrobenzene, 1-amino-2-bromo-ethoxycarbonylbenzene, 1-amino-2-methylsulphonyl-4-chlorobenzene, 1-amino-2,4-dinitro-6-methylsulphonylbenzene, 1-amino-2,4-dinitro-6-(2'-hydroxyethylsulphonyl)-benzene, 1-amino-2,4-dinitro-6-(2'-chloroethylsulphonyl)-benzene, 1-amino-2-methylsulfonyl-4-nitrobenzene, 1-amino-2-methyl-sulphinyl-4-nitrobenzene, 1-amino-2,4-dinitrobenzene, 1-amino-2,4- dicyanobenzene, 1-amino-2-cyano-4-methylsulphonylbenzene, 1-amino-2,6-dichloro-4-cyanobenzene, 1-amino-2,6-dichloro-4-nitrobenzene, 1-amino-2,6-dichloro-6-chlorobenzene, cyclohexyl 4-aminobenzoate, 1-amino-2,4-dinitro-6-chlorobenzene and, in particular, 1-amino-2-cyano-4nitrobenzene, as well as 1-aminobenzene-2-, -3- or -4-sulphonamides, for example the N-methylamide or N,N-dimethylamide or the N,N-diethylamide, N,γ-isopropoxypropyl-2-aminonapthaline-2-6-sulphonamide, N,γ-isopropoxypropyl-1-aminobenzene-2-, -3- or -4-sulphonamide, N-isopropyl-1-aminobenzene-2-, -3- or -4-sulphonamide, N,γ-methoxypropyl-1-aminobenzene-2-, -3- or -4-sulphonamide, N,N-bis-(β-hydroxyethyl)-1-aminobenzene-2-, -3- or -4-sulphonamide, 1-amino-4-chlorobenzene-2-sulphonamide and the N-substituted derivatives thereof, 2-, 3- or 4-aminophenyl sulphamate, 2-amino-4-, -5- or -6-methylphenyl sulphamate, 2-amino-5-methoxyphenyl sulphamate, 3-amino-6-chlorophenyl sulphamate, 3-amino-2,6-dichlorophenyl sulphamate, 4-amino-2- or -3-methoxyphenyl sulphamate, 2-aminophenyl N,N-dimethyl-sulphamate, 2-aminophenyl N,N-di-n-butyl-sulphamate, 2-amino-4-chlorophenyl N,N-dimethyl-sulphamate, 3-aminophenyl N-n-propyl-sulphamate, 3-aminophenyl N,N-di-n-butyl-sulphamate, O-(3-aminophenyl) N-morpholine-N-sulphonate, O-(3-aminophenyl) N-piperidine-sulphonate, O-(3-aminophenyl) N-cyclohexyl-sulfamate, O-(3-aminophenyl) N-(N-methylaniline)-sulphonate, 3-amino-6-methylphenyl N,N-diethyl-sulphamate, O-(4-aminophenyl) N-ethylene-imine-sulphonate, 1-amino-4-bromobenzene, 1-amino-4-nitrobenzene, 1-amino-4-cyanobenzene, 1-amino-2,5-dicyanobenzene, 1-amino-4-methyl-sulphonylbenzene, 1-amino-4-alkoxycarbonylbenzene, 1-amino-2,4-dichlorobenzene, 1-amino-2,4-dibromobenzene, 1-amino-2-methyl-4-chlorobenzene, 1-amino-2-trifluoromethyl-4-chlorobenzene, 1-amino-2-cyano-4-chlorobenzene, 1-amino-2-carbomethoxy-4-chlorobenzene, 1-amino-2-methoxycarbonyl-4-nitrobenzene, 1-amino-2-chloro-4-cyanobenzene, 4-aminophenyl N,N-dimethyl-sulphamate, O-(n-propyl) O-(3-aminophenyl) sulphonate, O-β-chloroethyl O-(2-aminophenyl) sulphonate, O-benzyl O-(3-aminophenyl) sulphonate and O-ethyl O-(4-amino-2,6-dimethylphenyl) sulphonate and also 4-aminoazobenzenes, such as, for example, 4-aminoazobenzene, 4-amino-2-nitroazobenzene, 3,2'-dimethyl-4-aminoazobenzene, 2-methyl-5-methoxy-4-aminoazobenzene, 2,5-dimethoxy-4-aminoazobenzene, 4'-methoxy-4-aminoazobenzene, 2-methyl-4'-methoxy-4-aminoazobenzene, 3,6,4'-trimethoxy-4-aminoazobenzene, 4'-chloro-4-aminoazo-benzene, 2'- or 3'-chloro-4-aminoazobenzene, 3-nitro-4-amino-2',4'-dichloroazobenzene and 4-aminoazobenzene-4'-sulphonamide.

Amongst the heterocyclic amines which are free from groups conferring solubility in water those which contain a five-membered heterocyclic ring which has 2 or 3 hetero-atoms and in particular contains one nitrogen atom and one or two sulphur atoms, oxygen atoms or nitrogen atoms as hetero-atoms are also to be mentioned in particular.

The radical A is preferably a heterocyclic structure of the formula

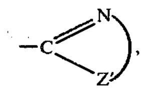

in which Z' represents the members necessary to complete a heterocyclic 5-membered or 6-membered ring, which can also contain fused aromatic rings and in which the rings can contain non-ionic substituents.

Examples of heterocyclic amines are: 2-aminothiazole, 2-amino-5-methylsulphonyl-thiazole, 2-amino-5-cyanothiazole, 2-amino-4-methyl-5-nitrothiazole, 2-amino-4-methylthiazole, 2-amino-4-phenylthiazole, 2-amino-4-(4'-chloro)-phenylthiazole, 2-amino-4-(4'-nitro)-phenyl-thiazole, 3-aminopyridine, 3-aminoquinoline, 3-aminopyrazole, 3-aminoindazole, 3-amino-1,2,4-triazole, 5-(methyl-, ethyl-, phenyl- or benzyl)-1,2,4-triazole, 3-amino-1-(4'-methoxyphenyl)-pyrazole, 2-aminobenzthiazole, 2-amino-6-methylbenzthiazole, 2-amino-6-methoxy-benzthiazole, 2-amino-5-chlorobenzthiazole, 2-amino-6-cyanobenzthiazole, 2-amino-6-thiocyanatobenzthiazole, 2-amino-6-nitrobenzthiazole, 2-amino-6-ethoxycarbonyl-benzthiazole, 2-amino-(4- or 6)-methylsulphonylbenzthiazole, 2-amino-1,3,4-thiadiazole, 2-amino-1,3,5-thiadiazole, 2-amino-4-phenyl- or -4-methyl-1,3,5-thiadiazole, 2-amino-5-phenyl-1,3,4-thiadiazole, 2-amino-3-nitro-5-methylsulfonyl-thiophene, 2-amino-3,5-bis-(methylsulphonyl)-thiophene, 5-amino-3-methylisothiazole, 2-amino-4-cyanopyrazole, 2-(4'-nitrophenyl)-3-amino-4-cyanopyrazole and 3- or 4-aminophthalimide.

Arylamines substituted by heterocyclic radicals (such as, for example, those mentioned in the list given above), such as, for example, amines of the formula

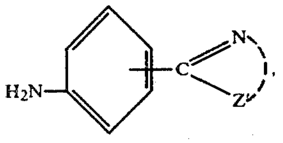

in which Z' has the same meaning as above, constitute a valuable category of arylamines. The radicals =N—A of the formulae

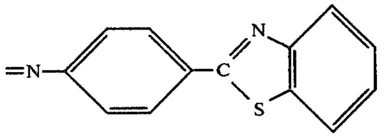

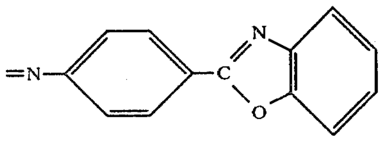

-continued

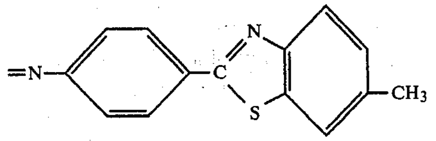

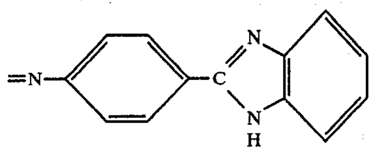

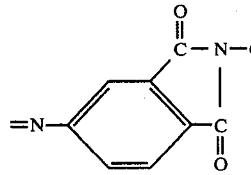

and also

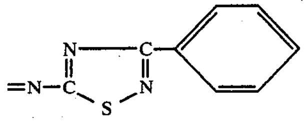

and

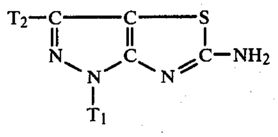

, in which $T_1$ represents phenyl or H and $T_2$ represents lower alkyl or H, may be mentioned.

In the carboxamide group —CO—Q, the radical Q of an amine QH denotes, for example, methylamino, ethylamino, dimethylamino, diethylamino, dipropylamino, di-n-butylamino, N-methyl-N-butylamino, N-(2-hydroxy-, 2-chloro-, 2-methoxy-, 2-bromo- or 2-cyano-ethyl)-amino, N,N-di-(2-hydroxy-, 2-chloro-, 2-methoxy-, or 2-cyanoethyl)-amino, N-2-cyanoethyl-N-ethylamino, N-2-cyanoethyl-N-2-hydroxyethylamino, N-2-lower alkoxy (for example $C_1$–$C_4$-alkoxy)-N-lower alkyl (for example $C_1$–$C_4$-alkyl-, especially methyl)-amino, N-methoxyethyl-N-cyanoethylamino, N-methyl-N-ethylamino, N-2-methylthioethylamino, N-2-methyl-sulphonylethylamino, γ-methoxypropylamino, γ-cyanopropylamino, γ-carboxypropylamino, γ-sulphopropylamino, N-hydroxyethyl-N-cyclohexylamino, 3-hydroxy-1,1-dimethyl-propylamino, benzylamino, o-, m- or p-nitrobenzylamino, o-, m- or p-methylbenzylamino, o-, m- or p-methoxybenzylamino, phenylethylamino, cyclohexylamino, methylcyclohexylamino, 2,2,5-trimethylcyclohexylamino, dicyclohexylamino, tetramethylenesulphonyl-3-amino, N-pyrrolidinyl, N-piperidinyl, N-methylpiperidinyl, N-morpholinyl, N-4-sulphapiperidinyl (N-thiomorpholinyl),

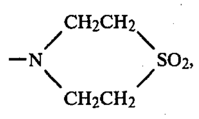

phenylamino, o-, p- or m-chlorophenylamino, 3,6-dichlorophenylamino, o-, m- or p-bromophenylamino, o- or p-fluorophenylamino, m-trifluoromethylphenylamino, m- or p-nitrophenylamino, o-, m- or p-methylphenylamino, o-, m- or p-lower alkoxyphenylamino, such as o-, m- or p-methoxyphenylamino, m- or p-carboxyphenylamino, m- or p-carboxamidophenylamino, m- or p-acetamidophenylamino, p- or m-aminosulphonylphenylamino, m-bis-(hydroxyethylamino)-sulphonylphenylamino, methylsulphonylphenylamino, p-(2-hydroxyethyl)-sulphonylphenylamino, N-cyclohexyl-N-phenylamino, N-methyl-N-phenylamino, N-phenyl-N-2-hydroxyethyl-amino, N-phenyl-N-2-cyanoethyl-amino, N-p-chlorophenyl-N-2-hydroxyethylamino, p-phenoxyphenylamino, p-(p'-chlorophenoxy)-phenylamino, p'-methylphenoxyphenylamino, m-chloro-o-phenoxyphenylamino, p-benzylphenylamino and p-acetamidophenylamino and p-propionylamidophenylamino, amino radicals of the formula

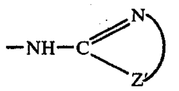

, in which Z' has the same meaning as above, such as, for example, thiazolyl-2-amino, benzthiazolyl-2-amino, benzoxazolyl-2-amino, 1,3,4-triazolyl-2-amino, 1-thia-3,4-diazolyl-2-amino and benzimidazolyl-2-amino and their methoxy, ethoxy, phenyl, chlorine, bromine, methyl, ethyl, carbomethoxy and carboethoxy derivatives, α- and β-tetrahydrofurfurylamino, 2-furfurylamino, N-α- and -β-tetrahydrofurfuryl-N-methylamino, thiophenyl-2-amino and pyridyl-3-amino, and the amino radicals derived from sulphanilic acid and taurine.

Preferably, the amines HQ and HQ' are so chosen that the radicals Q and Q' represent the groups of the formulae $NHR_1'$ and $NR_1'R_2'$, in which $R_1'$ and $R_2'$ are optionally substituted aralkyl radicals and, if $R_1'$ is an optionally substituted lower alkyl radical , $R_2'$ can also be an optionally substituted aryl radical and, if $R_1'$ is a hydrogen atom, $R_2'$ can be an optionally substituted alkyl radical, an optionally substituted aralkyl radical or an optionally substituted aryl radical.

Radicals R are, in addition to hydrogen, in particular alkyl with 1 to 8 carbon atoms, hydroxyalkyl with 2 or 3 carbon atoms, alkoxyalkyl with 3 to 8 carbon atoms, β-chloroethyl, β-cyanoethyl, alkoxycarbonylethyl with 1 to 4 carbon atoms in the alkoxy, carbamoylethyl, N-monosubstituted or N,N-disubstituted alkylcarbamoylethyl with 1 to 4 carbon atoms in the alkyl, cyclohexyl, benzyl, phenylethyl or phenyl and also alkenyl.

Examples which may be mentioned individually are: propyl, butyl, hexyl, β-ethylhexyl, β-hydroxyethyl or β-hydroxypropyl, methoxyethyl, ethoxyethyl, methoxypropyl, ethoxypropyl, butoxypropyl, amyloxypropyl, methoxycarbonylethyl, ethoxycarbonylethyl, allyl or butoxycarbonylethyl and, preferably, methyl, ethyl or β-cyanoethyl.

Individual meanings which are possible for the groups $R_1$, $R_2$, $R_1'$ and $R_2'$ are, for example, the following: $C_1$–$C_{18}$-alkyl groups, which are optionally substituted by $C_1$–$C_4$-alkoxy, hydroxyl, chlorine, bromine, cyano, carboxyl, carb-$C_1$–$C_4$-alkoxy, sulpho, carboxamide or acetoxy; examples which may be mentioned are methyl, butyl, propyl, ethyl, octyl, β-cyanoethyl, β-chloroethyl, β-hydroxyethyl, β-hydroxypropyl, β-hydroxy-γ-chloropropyl, β-carboxyethyl, β-carbomethoxyethyl, β-carboethoxyethyl or β-carbobutoxyethyl, β-carboxamidoethyl and β-acetoxyethyl, as well as cycloaliphatic groups, such as cyclopentyl, methylcyclohexyl, trimethylcyclohexyl and, preferably, cyclohexyl; or phenyl, benzyl or phenethyl which are optionally substituted by $C_1$–$C_{14}$-alkyl, such as methyl, lower alkoxy, such as methoxy, or halogen, such as chlorine.

Possible cations M are those of inorganic or organic bases, possible inorganic cations being, in particular, alkali metal cations, such as Na, K and Li, and ammonium, and possible organic cations being, for example, pyridinium, alkyl-ammonium and dialkyl-ammonium, in which the alkyl groups preferably have 1 to 4 carbon atoms, as well as cations of basic dyestuffs.

When it is used in connection with definitions, such as alkyl, alkoxy, carbalkoxy and the like, the term "lower" denotes that the alkyl radicals which occur in the radical contain not more than 4 carbon atoms.

Examples of non-ionic substituents Z on the rings B and C are alkyl, alkoxy, halogen, nitro, alkylmercapto, alkylsulphonyl, arylsulphonyl, acylamino, cyano, carboxamide and sulphonamide, and alkyl is to be understood, in particular, as alkyl with 1 to 4 carbon atoms, such as methyl, ethyl, isopropyl and n-butyl, alkoxy groups are to be understood, in particular, as those with 1 to 4 carbon atoms, such as methoxy, ethoxy, n-propoxy, n-butoxy and isopropoxy, halogen radicals are to be understood as, in particular, chlorine and bromine, in addition to fluorine, alkylmercapto and alkylsulphonyl are to be understood, in particular, as those which have 1 to 4 carbon atoms in the alkyl radical, such as methylmercapto, β-hydroxy-ethylmercapto, isopropylmercapto or n-butylmercapto or methylsulphonyl, β-hydroxy-ethylsulphonyl, isopropylsulphonyl or n-butylsulphonyl, arylsulphonyl is to be understood, in particular, as phenylsulphonyl, aralkylsulphonyl is to be understood as, preferably, benzylsulphonyl, acylamino is to be understood as, in particular, $C_1$–$C_4$-alkylcarbonylamino, such as acetylamino, and $C_1$–$C_4$-alkylsulphonylamino, such as methylsulphonylamino, and carboxamide and sulphonamide radicals are to be understood, in particular, as carboxamide or sulphonamide radicals which are substituted by one or two alkyl radicals which contain 1 to 4 carbon atoms, such as methyl, ethyl or n-butyl.

Groups which confer solubility in water are, above all, sulphonic acid groups and groups which have positively charged (quaternary) nitrogen atoms. It is true that free carboxyl groups (—COOH) are as a rule included amongst the groups conferring solubility in water, but these as a rule effect solubility in water only in the form of their salts, for example the alkali metal salts, so that their exclusion merely represents a preferred embodiment. If they are sulphonated, the dyestuffs preferably contain only one sulphonic acid group.

The reaction of the naphtholactam of the formula (II) with the amines of the formula (III) is carried out in the presence of an acid condensing agent, such as phosphorus oxybromide, phosphorus trichloride, phosphorus tribromide, phosphorus pentachloride, thionyl chloride, phosgene (in an autoclave) or mixtures of phosphorus oxychloride and phosphorus pentoxide, but especially in the presence of phosphorus oxychloride.

The reaction is advantageously carried out with heating, for example at temperatures of 50° to 200° C., but preferably in a range from 60° to 130° C. It is appropriately carried out in an inert organic solvent such as benzene, toluene, xylene, chlorobenzene, dichlorobenzene, nitrobenzene, ethylene chloride, carbon tetrachloride or chloroform.

The condensation reaction of compound IV and II or V is carried out under alkaline reaction conditions, appropriately in an organic solvent, such as methanol, ethanol, butanol, ethylene glycol monomethyl ether, dimethylformamide, pyridine or chlorobenzene, in the presence of a condensing agent having an alkaline reaction, such as triethylamine, pyridine, potassium carbonate, sodium hydroxide or magnesium oxide, at elevated temperature, appropriately at 40° to 160° C. and preferably at 60° to 100° C.

The starting materials of the formula (IV) are accessible by a known route by reacting a naphtholactam compound of the formula (II) with diphosphorus pentasulphide to give the corresponding thione compound and reacting the latter with quanternising agents R-An, preferably dimethyl sulphate.

The optional subsequent sulphonation of compounds of the formula I which are free from sulphonic acid groups is appropriately carried out by reacting the compounds with customary sulphonating agents, preferably oleum containing 5 to 60% of $SO_3$, one to two sulpho groups being introduced by this means. The reaction is appropriately carried out at temperatures between 5° and 50° C. by methods which are in themselves known.

The optional nitration is carried out in the customary manner using a mixture of nitric acid and sulphuric acid and halogenation is carried out by means of the action of elementary bromine or chlorine.

A further route to the dyestuffs of the formula I consists in carrying out the condensation reaction with halogen-containing condensing agents, such as, in particular, phosphorus oxychloride, so that a —CO-halogeno group, especially a chlorocarbonyl group, is formed in the 4-position of the naphtholactam and this group is subsequently reacted with alcohols, phenols, amines or mercaptans to give the corresponding esters, amides or thio-esters.

Alcohols and phenols which are suitable for the reaction are, for example, methanol, ethanol, m-propanol, i-propanol, butanol, sec.-butanol, iso-butanol, 1,2-dihydroxybutane, 2,5-dihydroxyhexane, 3-methyl-1,5-dihydroxypentane, 2-ethyl-hexanol, 2,2-dimethylpentanol, 2,2,4-trimethylpentanol, dodecyl alcohol, octadecyl alcohol, benzyl alcohol, cyclohexanol, allyl alcohol, methallyl alcohol, cinnamyl alcohol, lauryl alcohol, oleyl alcohol, cyclohexanol, tetrahydrofuryl alcohol, diethylene glycol monomethyl ether or diethylene glycol monoacetate, triethylene glycol monobutyl ether, ethylene glycol, 1,3-propylene glycol, 1,4-butanediol, 1,5-pentanediol, 1,6-hexanediol, neopentyl glycol, 2,2-diethylpropane-1,3-diol, 2-ethyl-2-butylpropane-1,3-diol, 2-ethyl-2-propylpropane-1,3-diol, 2,2,4-trimethylhexane-1,6-diol, 2-ethyl-2-methylpropane-1,3-diol, 1,10-decanediol, diethylene glycol, triethylene glycol, $\beta,\beta'$-thiodiethanol, 1,1-, 1,2-, 1,3- and 1,4-dimethylolcyclohexane and 1,2-, 1,3- and 1,4-$\alpha,\alpha'$-xylene glycol; phenol and mono- and poly-alkylphenols, for example 2-, 3- or 4-methyl-, -ethyl-, -n-propyl-, -isopropyl-, -n-butyl-, -iso-butyl-, -tert.butyl-, -n- or -iso-pentyl-, -n- or -iso-dodecyl-, -n- or -iso-palmityl-, -n- or -iso-stearyl-, -ethane-, -propene-, -butene- and -ethane-phenol, 2,3-, 2,4-, 2,5-, 2,6-, 3,4- or 3,5-dimethyl-, -diethyl- and -dipropyl-phenols, 2,3,4-, 2,3,5-, 2,3,6-, 3,4,5- or 2,4,6-trimethyl-, -triethyl- and -tripropyl-phenols, 2,3,4,6-, 2,3,4,5- or 2,3,5,6-tetramethyl-, -tetraethyl- and -tetrapropyl-phenols and 2,3,4,5,6-pentamethyl-phenol, it also being possible for the abovementioned alkyl radicals to be mixed, for example 2,6-dimethyl-4-tert.-butylphenol; cycloalkylphenols, for example 2-, 3- or 4-cyclohexylphenol; substituted alkylphenols, for example 4-chloromethyl-, 4-hydroxymethyl- and 3-trifluoromethyl-phenol; aralkylphenols, for example 2-, 3- or 4-benzyl-phenols; arylphenols, for example 2-, 3- or 4-hydroxydiphenyl; alkylamino-, arylamino- and acylamino-phenols, for example 2-, 3- or 4-acetylamino-, 2-, 3- or 4-benzoyl amino-, 2-, 3- or 4-methacroylamino- and N-methyl-N-formyl-4-amino-phenol; halogeno-phenols, for example 2-, 3- or 4-chloro- or -bromo-phenol, 2,3-, 2,4-, 2,5-, 2,6-, 3,4- or 3,5-dichloro(bromo)-phenol, 2-methyl-5-chloro-, 2-methyl-6-chloro-, 3-methyl-4-chloro-, 5-methyl-2-chloro-, 2-methyl-4-chloro- or 2-methyl-3-chloro-phenol and 3,5,3',5'-tetrachloro-2,2'-dihydroxydphenyl; nitrophenols, for example 2-, 3- or 4-nitrophenol, 2-methyl-5-nitro-, 4-methyl-2-nitro-, 3-methyl-4-nitro-, 4-methyl-3-nitro- and 3,5-dimethyl-4-nitro-phenol; hydroxyphenylsulphonic acids and hydroxyphenylcarboxylic acids and their esters and amides, for example 3- or 4-hydroxybenzoic acid or -benzenesulphonic acid, 2-, 3- or 4-hydroxybenzoic acid (or -benzenesulphonic acid) methyl ester, propyl ester, isobutyl ester, phenyl ester, naphthyl ester and halogenophenyl esters, 2-hydroxy-5-chlorobenzoic acid esters, 2-cyanato-3-methyl-benzoic acid esters, 2-, 3- or 4-hydroxybenzoic acid dimethylamide, diethylamide, morpholylamide or piperidylamide; alkoxy-, aryloxy- and acyloxy-phenols, for example 2-, 3- or 4-methoxy-, -ethoxy-, -propoxy-, -isopropoxy-, -butoxy-, -phenoxy-, -acetoxy- and -benzoxy-phenols, N,N-dialkylcarbamate and 4-allyl-2-methoxyphenol; acylphenols, for example 2-, 3- or 4-acetyl-, -propionyl- and -benzoyl-phenol and 4-acetyl-1,3-dihydroxybenzene; cyanophenols, for example 2-, 3- or 4-cyanophenol; phenols with S-containing substituents, for example 2-, 3- or 4-methylmercapto-, -ethylmercapto-, propylmercapto-, -phenylmercapto-, -acetylmercapto- and -benzoylmercapto-phenols, 3- or 4-mercaptophenols, 2,4-bis-methylmercapto-3-methyl-phenol and

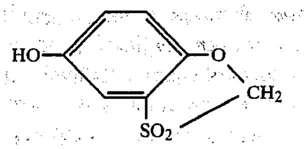

;

polyhydric phenols, such as, for example pyrocatechol, hydroquinone, resorcinol and the like; alkylated dihydroxyphenols, such as, for example, 1,3-dihydroxy-4-methylbenzene or 1,2-dihydroxy-4-hexylbenzene; alkoxylated dihydroxyphenols, such as, for example, 14-dihydroxy-3-hexoxybenzene; cycloaliphatic phenols, such as, for example, p-cyclopentylphenol or p-cyclohexylphenol; halogenated dihydroxyphenols, such as, for example, 1,2-dihydroxy-4-chlorobenzene; trihydric phenols, such as, for example, phloroglucinol or pyrogallol; and polynuclear phenols, such as, for example, 2,2-bis-(p-hydroxyphenyl)-propane, 4,4'-dihydroxydiphenyl, 2,2'-dihydroxydiphenyl, 2,4'-dihydroxydiphenyl and dihydroxynaphthalenes, such as 2,6-dihydroxynaphthalene. Dihydroxyarylsulphones, for example bis-p-hydroxyphenyl)-sulphone, 2,4'-dihydroxydiphenylsulphone, 5'-chloro-2,4-dihydroxydiphenylsulphone, 5'-chloro-2,4'-dihydroxydiphenylsulphone, 3'-chloro-4,4'-dihydroxydiphenylsulphone and bis-(4-hydroxyphenyl)-biphenyldisulphone, can also be used.

Aromatic dihydroxy-ethers, for example p,p'-dihydroxy-diphenyl ether, p,p'-dihydroxytriphenyl ether, the 4,3'-, 4,2'-, 3,3'-, 2,2'- and 2,3'-dihydroxydiphenyl ethers and 4,4'-dihydroxy-2,5-dimethyldiphenyl ether, are also suitable, as are the addition products of equimolar amounts of ethylene oxide and mercaptans, and also n-butylmercaptan, phenylmercaptan, 2-, 3- or 4-chlorophenylmercaptan, 2,4- or 2,5-dichlorophenylmercaptan, 2-, 3- or 4-methylphenylmercaptan, 2,4- or 2,5-dimethylphenylmercaptan, 2-, 3- or 4-methoxyphenylmercaptan, 2,4- or 2,5-dimethoxyphenylmercaptan, 2- or 4-nitrophenylmercaptan, 2-,or 4-carbomethoxyphenylmercaptan, 2-mercapto-benzthiazole, 2-mercapto-6-chloro-benzthiazole, 2-mercapto-4-chloro-benzthiazole, 2-mercapto-4-methyl-benzthiazole, 2-mercapto-6-methyl-benzthiazole, 2-mercapto-6-methoxy-benzthiazole, 2-mercapto-6-ethoxy-benzthiazole, 2-mercapto-benzoxazole and 2-mercaptobenzimidazole.

Compounds $H_2N—NR_3R_4$ which can be employed, optionally in the form of their salts, such as hydrochlorides, hydrobromides, hydroiodides, nitrates, sulphates or acetates, are, for example, the following hydrazines and hydrazides and cyclohexanone hydrazone: methylhydrazine, isopropylhydrazine, phenylhydrazine, 2-nitrophenylhydrazine, 3-nitrophenylhydrazine, 4-nitrophenylhydrazine, 2,4-dinitrophenylhydrazine, 2-chlorophenylhydrazine, N-aminopiperidine, N-aminopyrrolidine, N-aminomorpholine, N-aminocarbazole, N-aminotetrahydro(iso)quinoline, methanesulphonic acid hydrazide, ethanesulphonic acid hydrazide, isopropanesulphonic acid hydrazide, hexanesulphonic acid hydazide, cyclohexanesulphonic acid hydrazide, $C_1$–$C_4$- alkanoylhydrazides, such as acetylhydrazide, benzoylhydrazide, benzenesulphonic acid hydrazide, 2-, 3- or 4-toluenesulphonic acid hydrazide, 2-, 3- or 4-chloro-(bromo- or fluoro-)benzenesulphonic acid hydrazide, 2-, 3- or 4-hydroxybenzenesulphonic acid hydrazide, 2-, 3- or 4-dimethylaminobenzenesulphonic acid hydrazide, 2-, 3- or 4-nitrobenzenesulphonic acid hydrazide, 2-, 3- or 4-methylmercapto-benzenesulphonic acid hydrazide, quinolinesulphonic acid hydrazides, carbazolesulphonic acid hydrazides, phenylpyrazolonesulphonic acid hydrazides and imidazolesulphonic acid hydrazides.

The naptholactam compounds of the formula II, which are employed as starting materials, are obtainable by reacting o-xylylene dicyanide with glyoxal in the presence of a base (NaOH or KOH) and a solvent at temperatures below 50° C. (for example 0° to 40° C.) to give 1,4-dicyanonaphthalene and subsequently either (a) saponifying the 1,4-dicyanonaphthalene in a basic or, preferably, acid medium to give the 1,4-dicarboxylic acid and either converting the 1,4-naphthalene-dicarboxylic acid into a functional derivative and then converting the latter, using a 10 to 50% excess of nitric acid, to the 8-nitro-1,4-naphthalene-dicarboxylic acid derivative and reducing this to the 8-amino derivative, or nitrating the 1,4-naphthalene-dicarboxylic acid direct and subsequently reducing the reaction product to the 8-amino-naphthalene-1,4-dicarboxylic acid, and then converting the 8-amino derivative into the 1,8-naphtholactam-4-carboxylic acid, or functional derivatives thereof, either by spontaneous cyclisation or by warming, or (b) nitrating the 1,4-dicyanonaphthalene in the 8-position using a 10 to 50% excess of nitric acid and subsequently reducing the nitro group to the 8-amino group, effecting naphtholactam cyclisation by spontaneous formation or by warming and saponifying the cyano group in the 4-position, if this has not already been saponified during the reduction of the 8-nitro group, in a basic or acid medium, optionally via the stage of the 4-carboxamido-1,8-naphtholactam.

The naphtholactams which contain an organic group as the substituent R on the lactam ring are obtained, for example, by alkylating the corresponding naphtholactams which carry hydrogen on the nitrogen atom of the lactam ring (R=H) in a polar aprotic solvent, such as dimethylformamide or N-methylpyrrolidone, with a toluenesulphonic acid ester of the formula

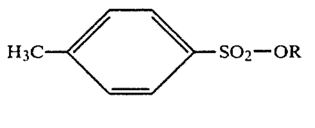

in the presence of a strong base, such as sodium hydroxide or potassium hydroxide. R has the same meaning as above.

The dyestuffs of the formula I give brilliant, luminous yellow to orange dyeings which usually fluoresce in UV light and have outstanding fastness properties in use, the dyestuffs which are free from groups conferring solubility in water being especially valuable.

The new dyestuffs are preferably free from sulphonic acid groups and are suitable for dyeing semi-synthetic and fully synthetic fibres, such as acrylic fibres or acrylonitrile fibres, polyacrylonitrile fibres and copolymers of acrylonitrile and other vinyl compounds, such as acrylates, acrylamides, vinylpyridine, vinyl chloride or vinylidene chloride, copolymers of dicyanoethylene and vinyl acetate and also acrylonitrile block copolymers, fibres made of polyurethanes, polyolefines, such as base-modified, nickel-modified or unmodified polypropylene, and cellulose triacetate and cellulose 2$\frac{1}{2}$-acetate and especially fibres made of polyamides, such as Nylon-6, Nylon-6,6 or Nylon 12, and fibres made of aromatic polyesters, such as those of terephthalic acid and ethylene glycol or 1,4-dimethylolcyclohexane and copolymers of terephthalic acid and isophthalic acid and ethylene glycol.

Dyeing of the said fibre materials with the dyestuffs, which preferably are sparingly soluble in water, is preferably effected from an aqueous dispersion.

It is therefore appropriate finely to divide those dyestuffs which can be used as disperse dyestuffs, by grinding with textile auxiliaries, such as, for example, dispersing agents and possibly grinding auxiliaries. Subsequent drying gives dyestuff formulations which consist of the textile auxiliary and the dyestuff.

Examples which may be mentioned of dispersing agents, of the non-ionic group, which can advantageously be used are: addition products of 8 mols of ethylene oxide with 1 mol of p-tert.-octylphenol, of 15 or 6 mols of ethylene oxide with castor oil and of 20 mols of ethylene oxide with the alcohol $C_{16}H_{33}OH$, addition products of ethylene oxide with di-[α-phenylethyl]-phenols, polyethylene oxide tert.-dodecyl thioethers, polyamine polyglycol ethers or addition products of 15 or 30 mols of ethylene oxide with 1 mol of the amine $C_{12}H_{25}NH_2$ or $C_{18}H_{37}NH_2$.

Anionic dispersing agents which may be mentioned are: sulphuric acid esters of alcohols of the fatty series with 8 to 20 carbon atoms, of the ethylene oxide adducts of the corresponding fatty acid amides, or of alkylated phenols with 8 to 12 carbon atoms in the alkyl radical; sulphonic acid esters containing alkyl radicals with 8 to 12 carbon atoms in the alkyl radical; sulphonic acid esters containing alkyl radicals with 8 to 20 carbon atoms; sulphation products of unsaturated fats and oils; phosphoric acid esters containing alkyl radicals with 8 to 20 carbon atoms; fatty acid soaps and also alkylarylsulphonates, condensation products of formaldehyde and naphthalenesulphonic acid and ligninsulphonates.

Suitable cationic dispersing agents are quaternary ammonium compounds which contain alkyl or aralkyl radicals with 8 to 20 carbon atoms.

In addition to the dispersing agents, the dyestuff formulations can also contain organic solvents, especially solvents which boil above 100° C. and which preferably are miscible with water, such as mono- and di-alkylglycol ethers, dioxane, dimethylformamide or dimethylacetamide, tetramethylenesulphone or dimethylsulphoxide. The dyestuff, the dispersing agent and the solvent can advantageously be ground together.

A dyestuff formulation of this type is manufactured, for example, by mixing 2 to 30, and preferably 5 to 20, percent by weight of the dispersing agent to a paste with 10 to 55 percent by weight, and preferably approximately the two-fold to four-fold amount, of the dyestuff and about 10 to 20 parts of a glycol or of another water-retaining agent. Subsequently, for example, the pH value is adjusted to about 9 with a dilute acid, preferably with sulphuric acid or acetic acid, and the mixture is then made up to 100% with water. The mixture is then ground to the necessary fineness, for example in a glass mill or another dispersing apparatus, and during this operation the grinding temperature can be between 20° and 90° C.

The dyeing of the polyester fibres with the dyestuffs according to the invention, which are sparingly soluble in water, from an aqueous dispersion is carried out by the processes customary for polyester materials. Polyesters of aromatic polycarboxylic acids with polyhydric alcohols are preferably dyed at temperatures of above 100° C. under pressure. However, dyeing can also be carried out at the boiling point of the dye bath in the presence of colour-transfer agents, for example phenylphenols, polychlorobenzene compounds or similar auxiliaries, or can be effected by the thermosol process, that is to say padding with subsequent hot after-treatment, for example thermofixing, at 180° to 210° C.

Cellulose 2½-acetate fibres are preferably dyed at temperatures of 80° to 85° C., whilst cellulose triacetate fibres are advantageously dyed at the boiling point of the dye bath. The use of colour-transfer agents can be dispensed with when dyeing cellulose 2½-acetate fibres or polyamide fibres. Dyestuffs according to the invention can also be used for printing the said materials by customary methods.

The dyeings obtained according to the present process can be subjected to an after-treatment, for example by heating with an aqueous solution of a non-ionic washing agent.

According to the present process it is also possible to apply the indicated compounds by printing, instead of by impregnating. For this purpose, for example, a printing ink which contains the finely dispersed dyestuffs in addition to the auxiliaries customary in printing, such as wetting agents and thickeners, is used.

Furthermore, for example, synthetic fibres, such as polyesters and polyamides, can be dyed in organic solvent liquors, such as in a mixture of perchloroethylene and dimethylformamide or in pure perchloroethylene.

Deep, luminous dyeings and prints with excellent fastness properties, especially fastness to light, thermofixing, sublimation, pleating, flue gas, cross-dyeing, dry-cleaning, ironing, rubbing, chlorine and wet processing, such as fastness to water, washing and perspiration, are obtained by the present process.

The new dyestuffs, which are insoluble in water, can also be used for spin-dyeing polyamides, polyesters and polyolefines. The polymer to be dyed is appropriately mixed, in the form of a powder, granules or chips, as a ready-to-use spinning solution or in the molten state with the dyestuff, which is introduced in the dry state or in the form of a dispersion or solution in an optionally volatile solvent. After homogeneous dispersion of the dyestuff in the solution or melt of the polymer, the mixture is processed in a known manner by casting, pressing or extruding to fibres, yarns, monofilaments, films and the like.

The dyestuffs according to the invention are outstandingly suitable for colouring macromolecular materials, such as lacquers, films, sheets and mouldings, for example those made of cellulose esters, such as cellulose 2½-acetate and cellulose triacetate, polyvinyl compounds, such as polyvinyl chloride and polyvinyl acetate; polyurethanes, polystyrene, polyesters, polyamides and polycarbonates in bulk. The dyestuffs which can be used for this application are, in particular, the compounds of the formula I which are not in the form of a salt and also those which contain sulpho groups and are in the form of salts of suitable organic cations, such as, for example those of alkylamines which solubilise fats or of basic dyestuffs.

The dyestuffs according to the invention possess high fastness to light, even in light dyeings and in combinations with other disperse dyestuffs, high brilliance (fluorescence), high fastness to sublimation, a low sensitivity to carriers in respect of the fastness to light and a high depth of colour, coupled with a good reserve for other fibres, for example wool fibres. They also have only a low sensitivity to changes in pH and are especially suitable for the high temperature process and the thermosol process as well as for permanent press finishing ("Koratron" process). They are also suitable for printing by all customary processes, including, inter alia, for the printing of mixed fabrics.

They possess a high fastness to light, good stability to heat and good solubility, even in the case of bulk dyeings (especially polyester spinning compositions). Coupled with a high fastness to sublimation, they display no migration on the surface when the fibres are subjected to heat treatments (for example on texturing) and display good fastness to rubbing.

The sulphonated representatives of the dyestuffs according to the invention are in the main used for dyeing wool and synthetic polyamides and, for this purpose, aqueous solutions which contain textile auxiliaries, such as, for example, levelling agents, are used.

In the examples which follow, parts denote parts by weight, unless otherwise stated, percentages denote percentages by weight and the temperatures are given in degrees Centigrade.

PREPARATION OF THE STARTING MATERIALS (a) 15.6 parts by weight of o-xylylene dicyanide and 8.5 parts by weight of glyoxal hydrate (trimer) (3 $C_2H_2O_2.2H_2O$) containing 80% of glyoxal to be liberated are stirred into 200 parts by volume of methanol. 11.2 parts by weight of powdered potassium hydroxide are added in portions to the reaction mixture, at 15°, whilst stirring and under nitrogen After the potassium hydroxide has been added, the reaction mixture is stirred for a further 15 hours at room temperature and under nitrogen. The slightly brown-coloured reaction mixture is then freed from methanol in vacuo and diluted with 500 parts by volume of water. The crude 1,4-dicyanonaphthalene which has precipitated is filtered off and washed with water until neutral. 11 parts by weight (61.8% of theory) of 1,4-dicyanonaphthalene are obtained in the form of slightly brown-coloured small needles with a melting point of 175° to 185° C.

After recrystallising once from alcohol with the aid of 5 parts by weight of active charcoal, 5.5 parts by weight of the compound

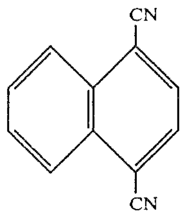

(101)

are obtained in the form of beautiful needles with a melting point of 204° to 205° C.

(b) 46.4 g of technical grade naphthalene-1,4-dicarboxylic acid (93% pure) are introduced at a temperature of 20° to 25° into a stirred flask which contains 480 g of 93% strength sulphuric acid, whilst stirring. The resulting thick suspension is cooled to 0° and a mixture consisting of 22 g of 63% strength nitric acid and 22 g of 93% strength sulphuric acid is allowed to run in dropwise in the course of 30 minutes at 0° to 2°, with external cooling. The mixture is then stirred for a further 5 hours at 0° to 5° and is then poured onto 1 kg of fine ice. The product which has precipitated is filtered off using a suction filter and is washed with water until neutral, after which the resulting product of the formula

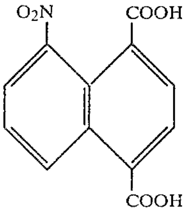

is dried in vacuo at 70°. Yield 45 g.

For purification, 45 g of the crude product are heated briefly to the boil with 225 ml of glacial acetic acid, the mixture is then allowed to cool and the product which has precipitated is filtered off at room tempeature. This gives the nitro compound in the form of a pale grey powder which dissolves completely in water when sodium carbonate is added.

Melting point 252°.

(c) 52 parts of 8-nitro-naphthalene-1,4-dicarboxylic acid are dissolved in 700 parts of absolute ethyl alcohol and the solution is boiled under reflux for 12 hours whilst continuously passing in hydrogen chloride gas. The resulting solution is evaporated in vacuo. The 4-ethoxycarbonyl-8-nitro-naphthalene-1-carboxylic acid of the formula

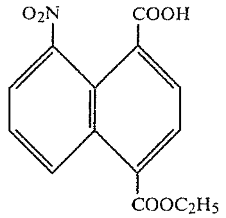

which is obtained in this way, melts at 178° to 180°.

If the monoester is hydrogenated, the 4-ethoxycarbonyl-1,8-naphtholactam described above is obtained and this confirms that the esterification of the carboxylic acid group has taken place in the 4-position.

(d) 130 parts of 8-nitro-naphthalene-1,4-dicarboxylic acid are dissolved in 500 parts of dimethylformamide, 40 parts of sodium hydroxide are added and after stirring for 30 minutes 170 parts of volume of diethyl sulphate are added all at once. The temperature then rises to 90°. The mixture is stirred for two hours, paying no attention to the temperature, a small amount of impurities is then filtered off from the solution and the filtrate is discharged into 2,500 parts by volume of a 10% strength sodium hydroxide solution. After stirring briefly, diethyl 8-nitro-naphthalene-1,4-dicarboxylate with a melting point of 107° to 109° is filtered off, washed and dried.

(e) 32 parts of diethyl 8-nitro-naphthalene-1,4-dicarboxylate are stirred into 200 parts of glacial acetic acid and, after adding 20 parts of iron powder, the mixture is boiled under reflux for 6 hours. For working up, the mixture is filtered hot, the filrate is diluted with an equal volume of water and the 4-ethoxycarbonyl-1,8-naphtholactam which is thus precipitated is filtered off, washed until neutral and dried. The product of the formula

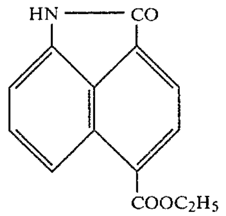

which is obtained in good yield, melts at 216° to 218°. Analysis gave the following values

| | C | H | N |
|---|---|---|---|
| calculated: | 69.7 | 4.6 | 5.8 |
| found: | 69.3 | 4.5 | 5.6. |

(f) 29 parts of dimethyl 8-nitro-naphthalene-1,4-dicarboxylate (which can be prepared analogously to Example 5 using dimethyl sulphate) are dissolved in 500 parts of ethyl acetate and hydrogenated with Raney nickel. 4-Methoxycarbonyl-8-amino-1-naphtholactam precipitates out virtually completely. After the hydrogenation has ended, the mixture is filtered and the residue is extracted with methylglycol. Evaporation of the extraction solution gives the ester of the formula

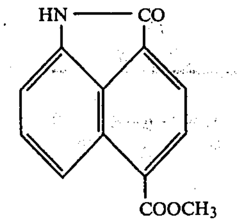

with a melting point of 264° to 266°. Analysis gave the following values:

| | C | H | N |
|---|---|---|---|
| calculated: | 68.72 | 3.99 | 6.17 |
| found: | 68.5 | 4.0 | 5.9. |

(g) 24 parts of 4-ethoxycarbonyl-8:amino-1-naphtholactam are boiled in 180 parts of water and 20 parts of a 30% strength sodium hydroxide solution for one hour under reflux, during which time everything goes into solution. This solution is filtered with charcoal whilst still hot and the filtrate is acidified. The 8-amino-1-naphtholactam-4-carboxylic acid which has precipitated is filtered off after cooling and washed with water and dried.

EXAMPLE 1

A mixture consisting of 4.80 g of 5-ethoxycarbonyl-naphtholactam, 3,55 g of 5-amino-3-phenyl-1,2,4-thiadiazole and 30 ml of chlorobenzene is stirred at 100° and a mixture of 2.10 ml of phosphorus oxychloride and 3 ml of chlorobenzene is allowed to run in dropwise in the course of about 30 minutes, after which the mixture is stirred for a further 90 minutes at the same temperature. After cooling, the precipitate formed is filtered off and this is then suspended in 40 ml of isopropanol. The mixture is warmed to 50° and 60 ml of a 10% strength solution of sodium bicarbonate are added to give a pH value of about 8. The dyestuff of the formula

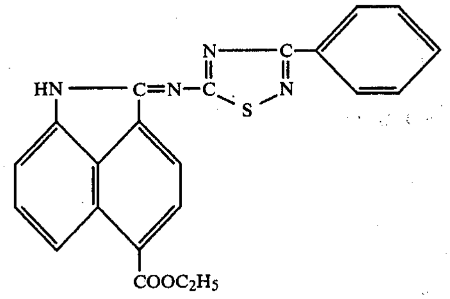

which has been liberated, is filtered off, washed with isopropanol and then dried at 100°. For purification, the dyestuff is recrystallised from methylene glycol monoethyl ether.

When applied as a disperse dyestuff at 130°, the dyestuff dyes fabric made of polyethylene glycol terephthalate brilliant reddish-tinged yellow. The dyeings possess very good fastness to sublimation and light.

If, with an otherwise identical procedure, equivalent amounts of the naphtholactam compounds listed under I in the table which follows are used in place of the naphtholactam compound mentioned initially and the heterocyclic amines of column II are used in place of the above aminothiadiazole, the dyestuffs of column III, which have similar properties are dye polyethylene terephthalate fabric (PET), from an aqueous liquor, in the indicated shades are obtained.

| No. | I Naphtholactam compounds | II Heterocyclic amines | III Dyestuffs | IV Shade on PET |
|---|---|---|---|---|
| 1 | 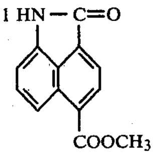 | 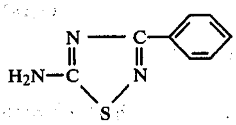 | 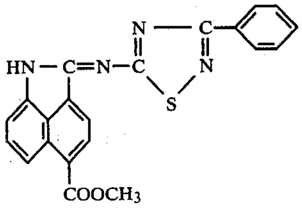 | reddish-tinged yellow |
| 2 | 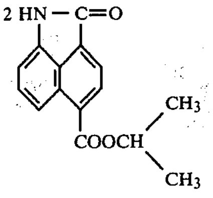 | " | 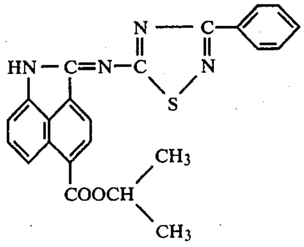 | reddish-tinged yellow |

-continued
| No. | I Naphtholactam compounds | II Heterocyclic amines | III Dyestuffs | IV Shade on PET |
|---|---|---|---|---|
| 3 | 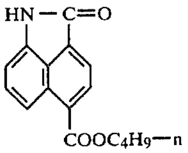 | " | 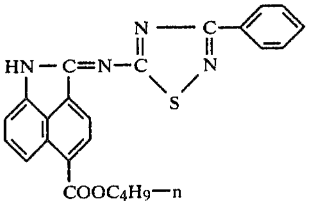 | red-dish-tinged yellow |
| 4 | 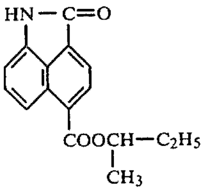 | " | 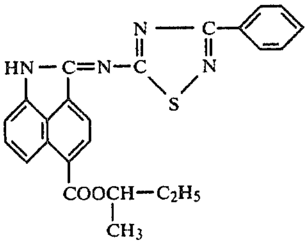 | red-dish-tinged yellow |
| 5 | 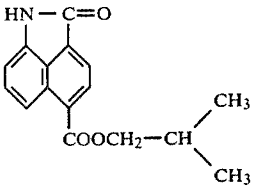 | " | 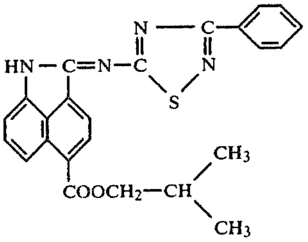 | red-dish-tinged yellow |
| 6 | 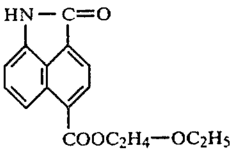 | " | 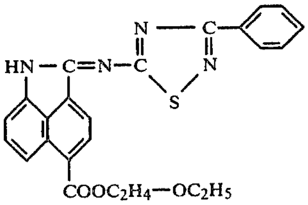 | red-dish tinged yellow |
| 7 | 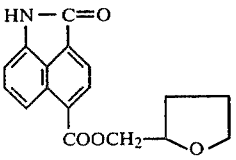 | " | 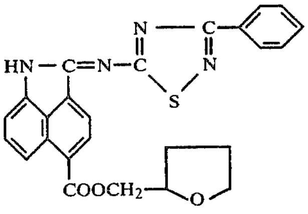 | red-dish-tinged yellow |
| 8 | 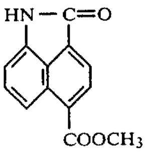 | 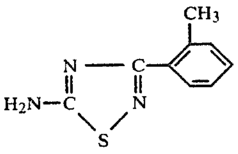 | 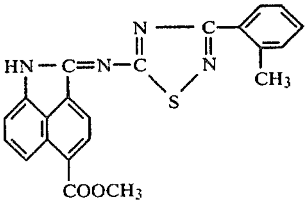 | red-dish-tinged yellow |
| 9 | 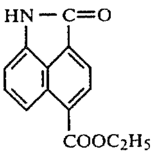 | " | 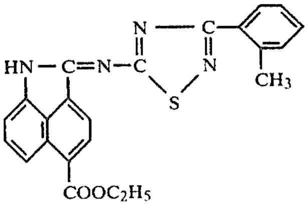 | red-dish-tinged yellow |

-continued
| No. | I Naphtholactam compounds | II Heterocyclic amines | III Dyestuffs | IV Shade on PET |
|---|---|---|---|---|
| 10 | 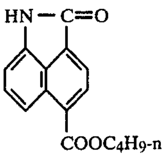 | ″ | 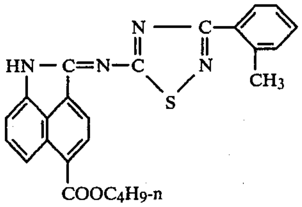 | red-dish-tinged yellow |
| 11 | 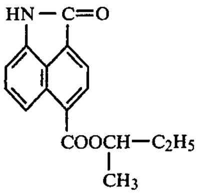 | ″ | 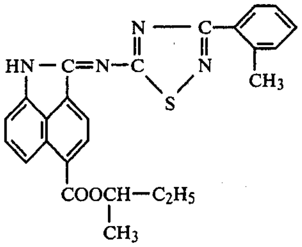 | red-dish-tinged yellow |
| 12 | 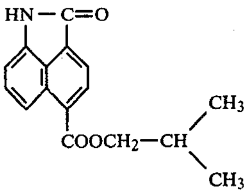 | ″ | 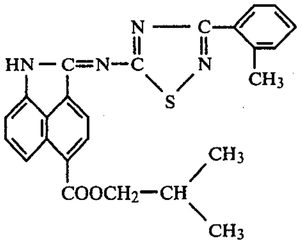 | red-dish-tinged yellow |
| 13 | 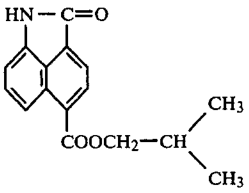 | 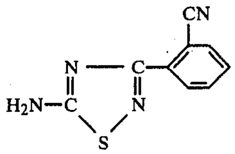 | 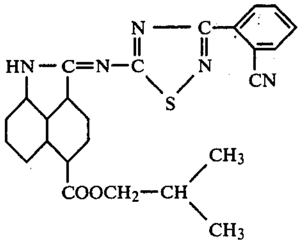 | red-dish-tinged yellow |
| 14 | 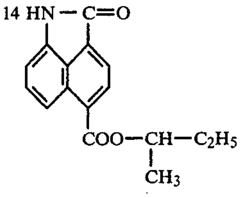 | ″ | 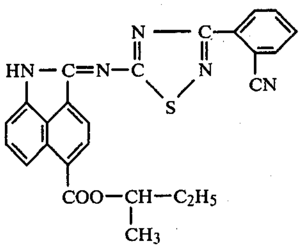 | red-dish-tinged yellow |
| 15 | 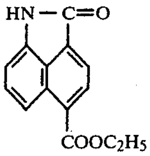 | 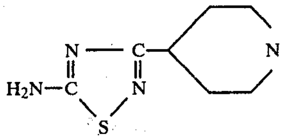 | 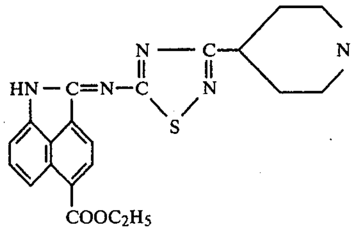 | red-dish-tinged yellow |

-continued
| No. | I Naphtholactam compounds | II Heterocyclic amines | III Dyestuffs | IV Shade on PET |
| --- | --- | --- | --- | --- |
| 16 | 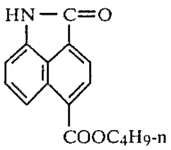 | " | 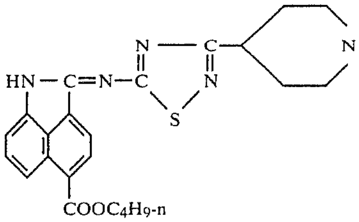 | red-dish-tinged yellow |
| 17 | 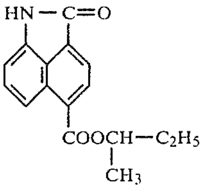 | " | 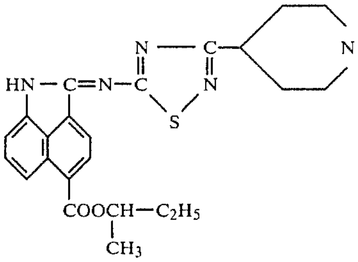 | red-dish-tinged yellow |
| 18 | 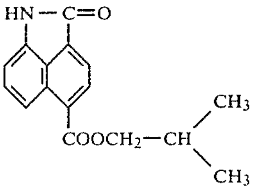 | " | 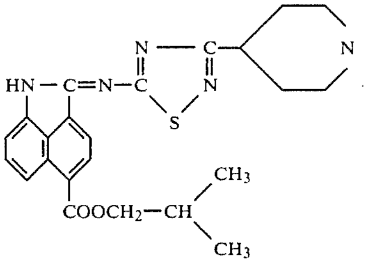 | red-dish-tinged yellow |
| 19 | 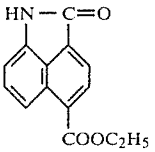 | 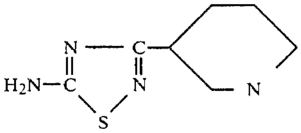 | 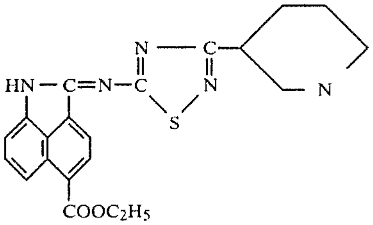 | red-dish-tinged yellow |
| 20 | 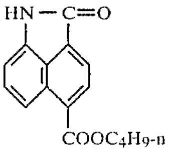 | " | 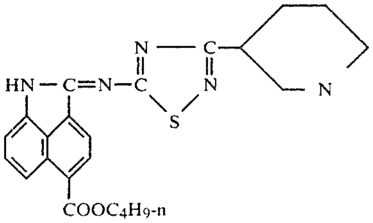 | red-dish-tinged yellow |
| 21 | 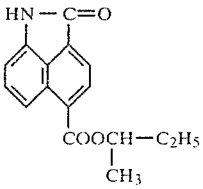 | " | 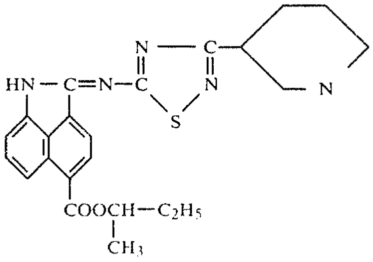 | red-dish-tinged yellow |

-continued
| No. | I Naphtholactam compounds | II Heterocyclic amines | III Dyestuffs | IV Shade on PET |
| --- | --- | --- | --- | --- |
| 22 | 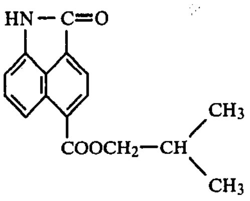 | " | 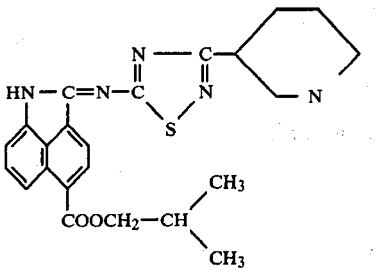 | red-dish-tinged yellow |
| 23 | 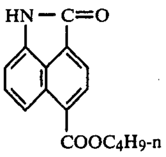 | 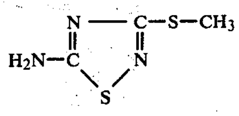 | 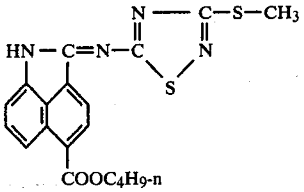 | red-dish tinged yellow |
| 24 | 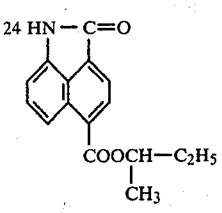 | " | 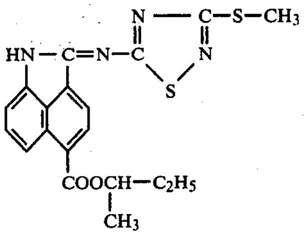 | red-dish tinged yellow |
| 25 | 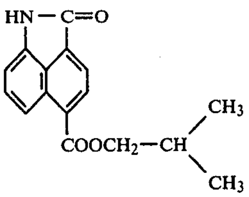 | " | 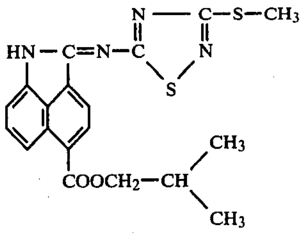 | red-dish-tinged yellow |
| 26 | 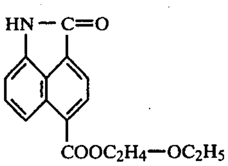 | " | 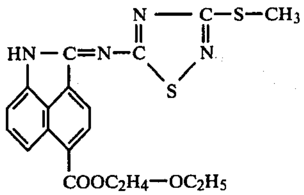 | red-dish-tinged yellow |
| 27 | 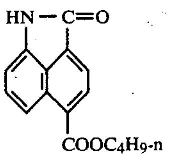 | 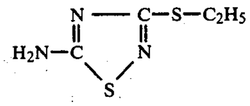 | 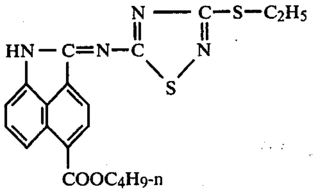 | red-dish-tinged yellow |
| 28 | 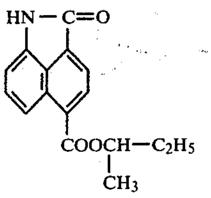 | " | 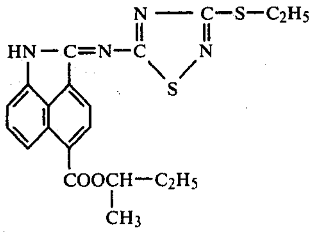 | red-dish-tinged yellow |

-continued
| No. | I Naphtholactam compounds | II Heterocyclic amines | III Dyestuffs | IV Shade on PET |
|---|---|---|---|---|
| 29 | 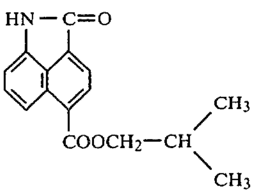 | " | 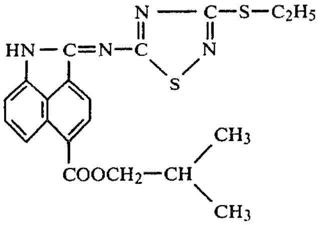 | red-dish-tinged yellow |
| 30 | 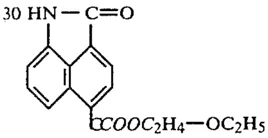 | " | 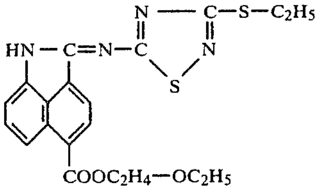 | red-dish-tinged yellow |
| 31 | 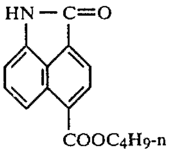 | 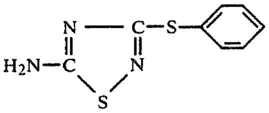 | 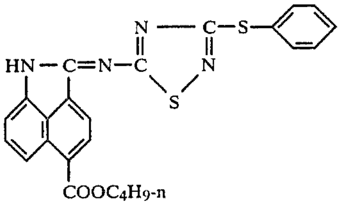 | red-dish-tinged yellow |
| 32 | 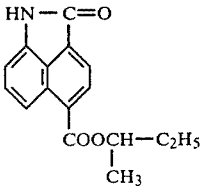 | " | 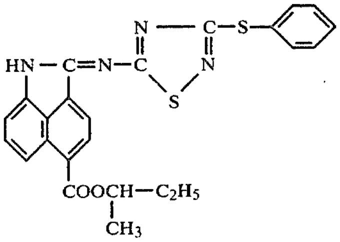 | red-dish-tinged yellow |
| 33 | 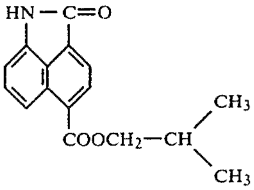 | " | 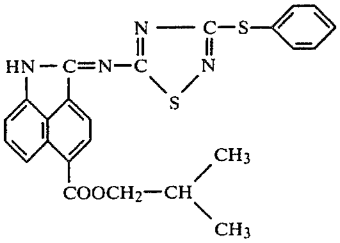 | red-dish-tinged yellow |
| 34 | 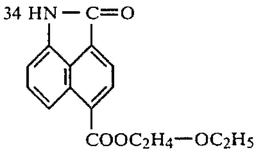 | " | 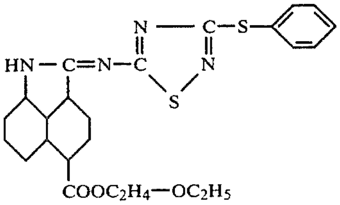 | red-dish-tinged yellow |
| 35 | 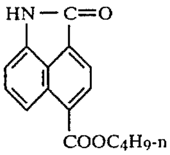 | 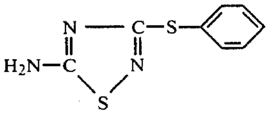 | 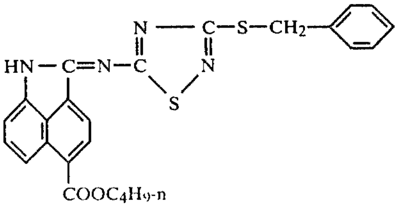 | red-dish-tinged yellow |

-continued
| No. | I Naphtholactam compounds | II Heterocyclic amines | III Dyestuffs | IV Shade on PET |
|---|---|---|---|---|
| 36 | 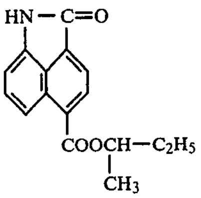 | ″ | 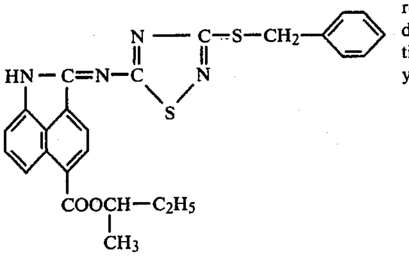 | red-dish-tinged yellow |
| 37 | 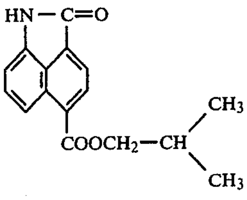 | ″ | 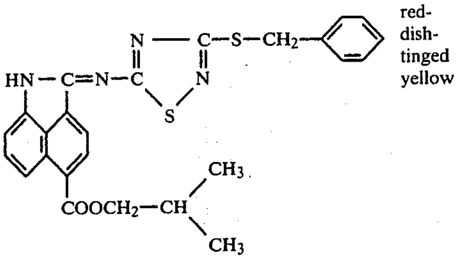 | red-dish-tinged yellow |
| 38 | 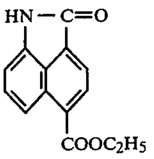 | ″ | 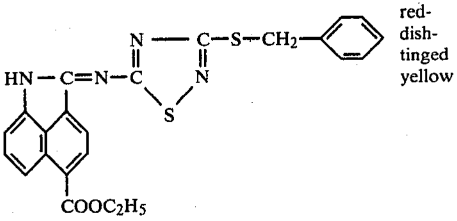 | red-dish-tinged yellow |
| 39 | 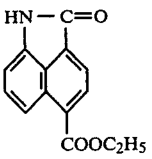 | 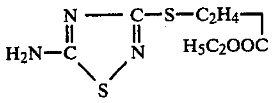 | 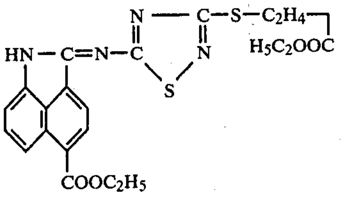 | red-dish-tinged yellow |
| 40 | 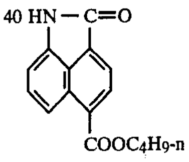 | ″ | 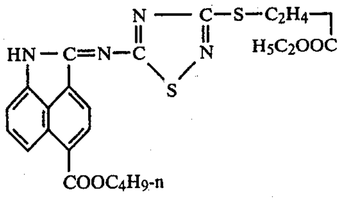 | red-dish-tinged yellow |
| 41 | 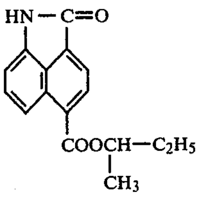 | ″ | 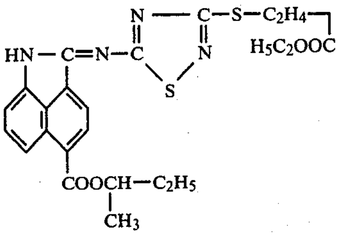 | red-dish-tinged yellow |
| 42 | 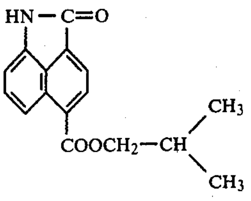 | ″ | 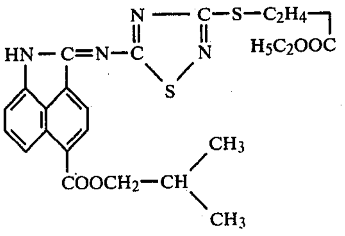 | red-dish-tinged yellow |

-continued
| No. | I Naphtholactam compounds | II Heterocyclic amines | III Dyestuffs | IV Shade on PET |
| --- | --- | --- | --- | --- |
| 43 | 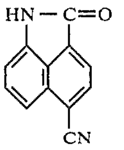 | 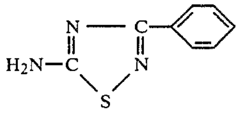 | 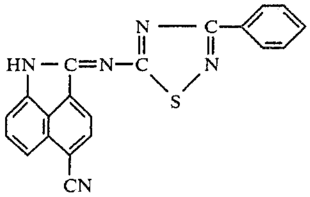 | red-dish-tinged yellow |
| 44 | ″ | 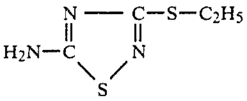 | 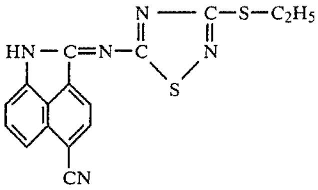 | red-dish-tinged yellow |
| 45 | ″ | 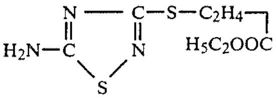 | 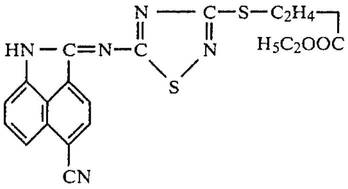 | red-dish-tinged yellow |
| 46 | 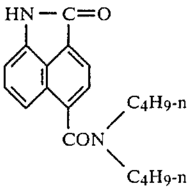 | 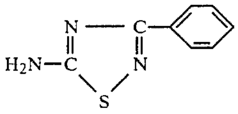 | 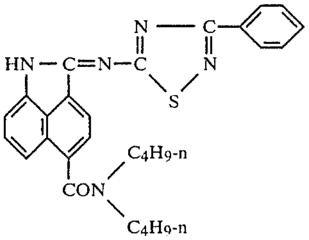 | red-dish-tinged yellow |
| 47 | 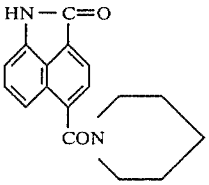 | ″ | 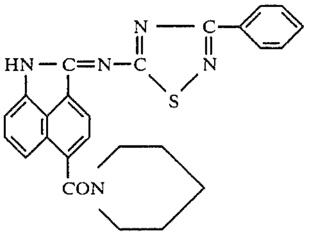 | red-dish-tinged yellow |
| 48 | 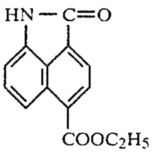 | 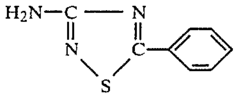 | 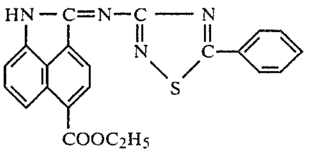 | red-dish-tinged yellow |
| 49 | 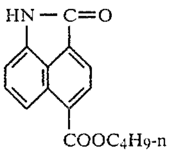 | 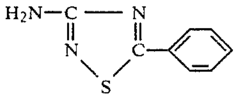 | 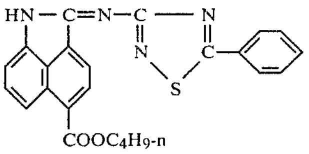 | red-dish-tinged yellow |
| 50 | 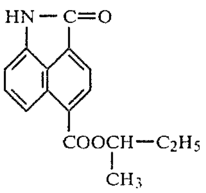 | ″ | 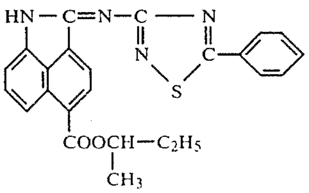 | red-dish-tinged yellow |

-continued
| No. | I Naphtholactam compounds | II Heterocyclic amines | III Dyestuffs | IV Shade on PET |
|---|---|---|---|---|
| 51 | 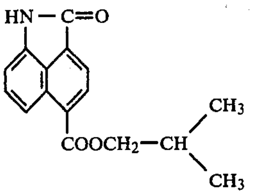 | " | 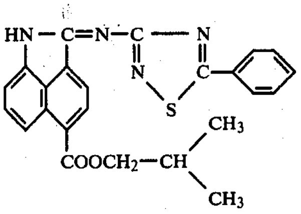 | reddish-tinged yellow |
| 52 | 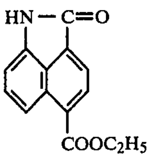 | 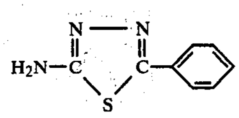 | 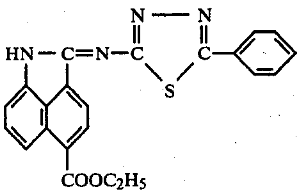 | yellow |
| 53 | 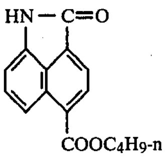 | " | 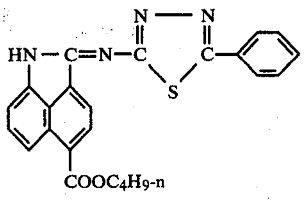 | " |
| 54 | 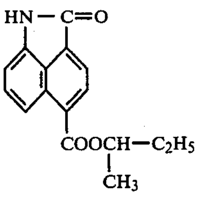 | " | 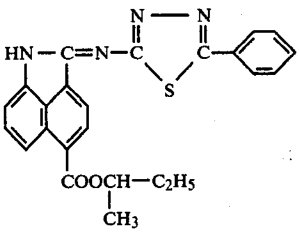 | " |
| 55 | 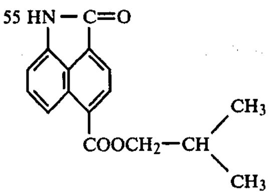 | " | 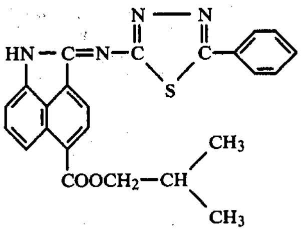 | " |
| 56 | 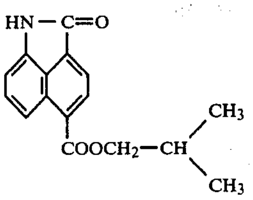 | 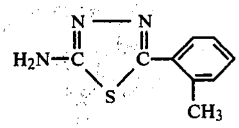 | 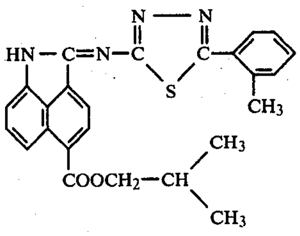 | " |
| 57 | 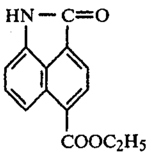 | " | 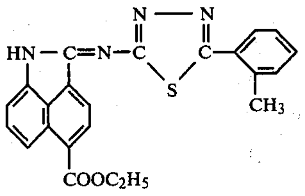 | " |

-continued
| No. | I Naphtholactam compounds | II Heterocyclic amines | III Dyestuffs | IV Shade on PET |
|---|---|---|---|---|
| 58 | 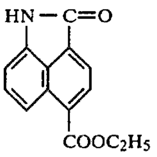 | 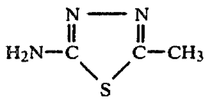 | 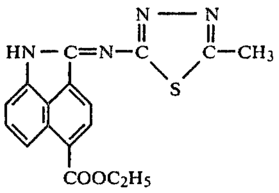 | ″ |
| 59 | 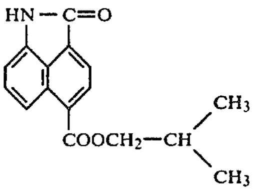 | ″ | 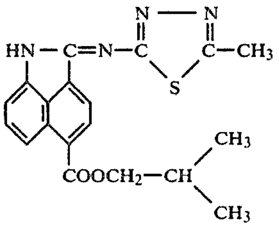 | ″ |
| 60 | ″ | 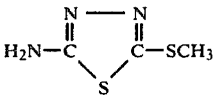 | 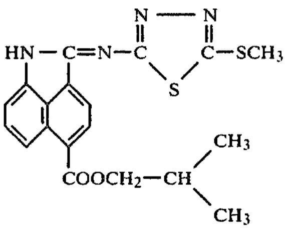 | ″ |
| 61 | 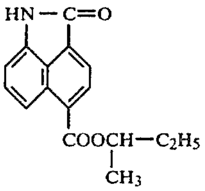 | ″ | 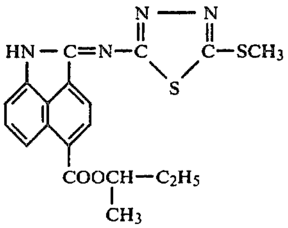 | ″ |
| 62 | 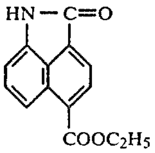 | 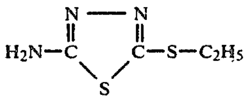 | 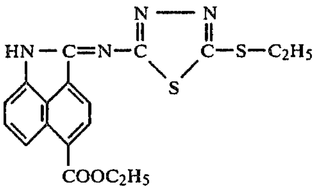 | ″ |
| 63 | 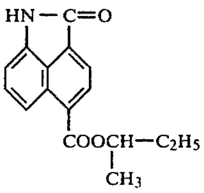 | ″ | 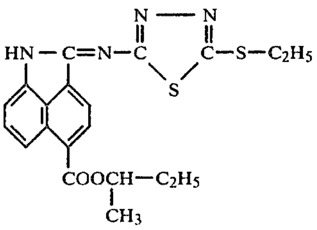 | ″ |
| 64 | 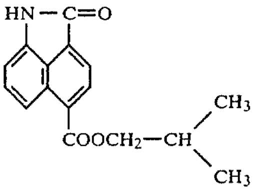 | ″ | 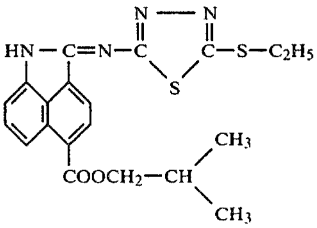 | ″ |

-continued
| No. | I<br>Naphtholactam<br>compounds | II<br>Heterocyclic<br>amines | III<br>Dyestuffs | IV<br>Shade<br>on<br>PET |
|---|---|---|---|---|
| 65 | " | 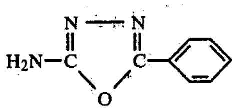 | 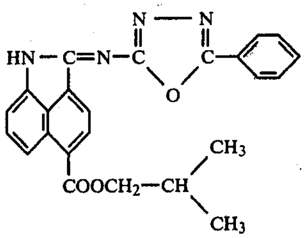 | " |
| 66 | 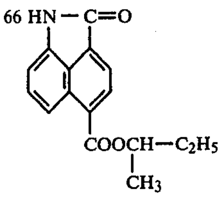 | " | 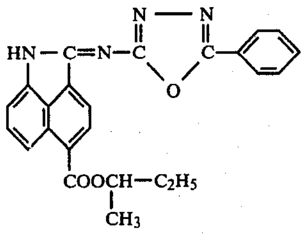 | " |
| 67 | 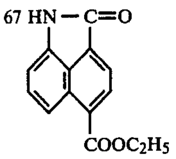 | " | 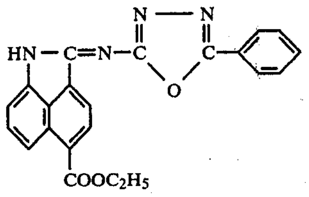 | " |
| 68 | " | 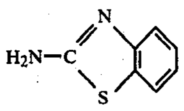 | 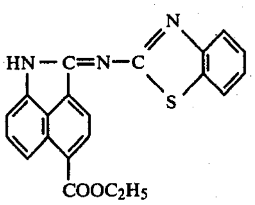 | reddish tinged yellow |
| 69 | 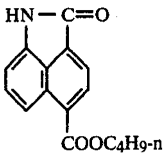 | " | 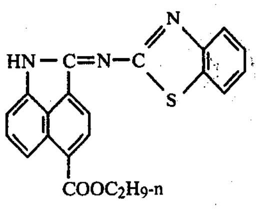 | reddish tinged yellow |
| 70 | 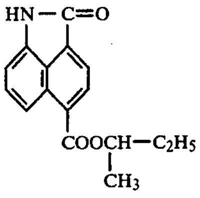 | " | 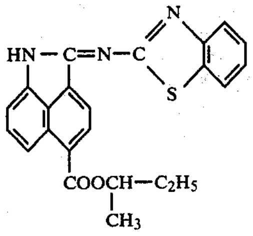 | reddish tinged yellow |
| 71 | 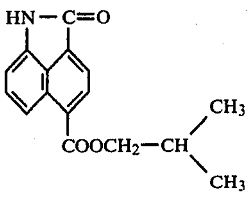 | " | 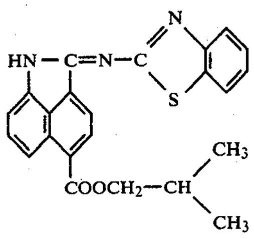 | reddish tinged yellow |

-continued
| No. | I Naphtholactam compounds | II Heterocyclic amines | III Dyestuffs | IV Shade on PET |
|---|---|---|---|---|
| 72 | 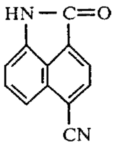 | " | 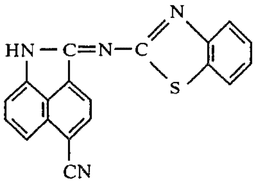 | yellow |
| 73 | 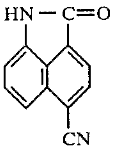 | " | 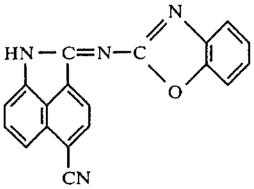 | " |
| 74 | 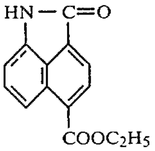 | " | 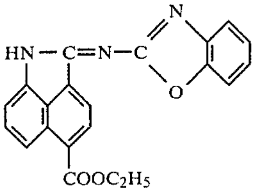 | " |
| 75 | 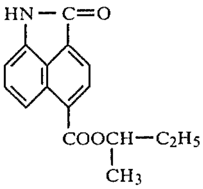 | " | 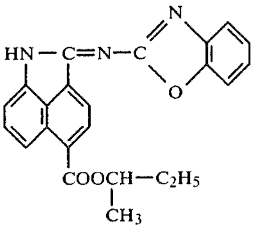 | " |
| 76 | 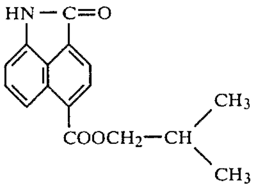 | " | 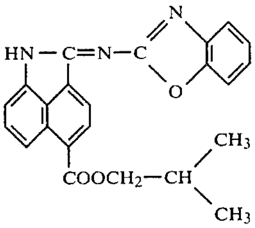 | " |
| 77 | 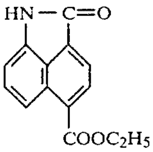 | 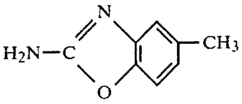 | 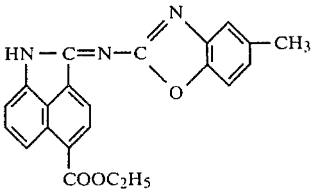 | " |
| 78 | 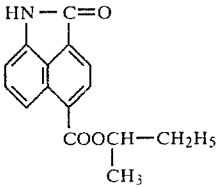 | " | 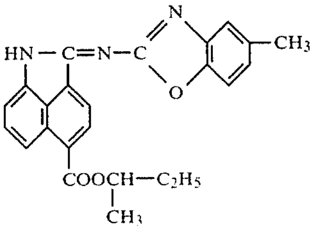 | " |

-continued
| No. | I Naphtholactam compounds | II Heterocyclic amines | III Dyestuffs | IV Shade on PET |
|---|---|---|---|---|
| 79 | 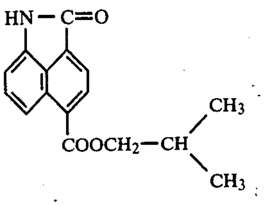 | ″ | 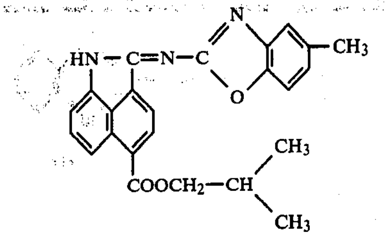 | ″ |
| 80 | ″ | 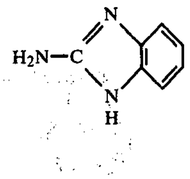 | 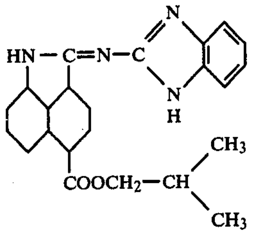 | ″ |
| 81 | 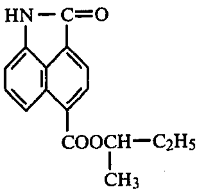 | ″ | 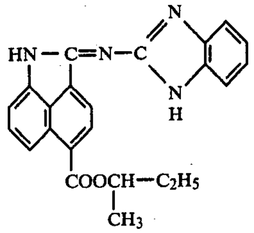 | ″ |
| 82 | 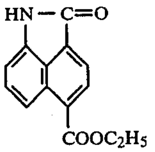 | ″ | 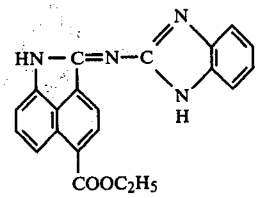 | ″ |
| 83 | ″ | 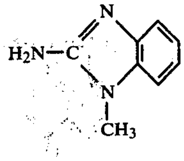 | 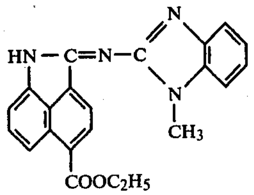 | ″ |
| 84 | 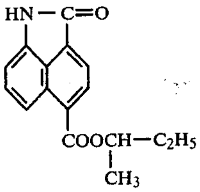 | ″ | 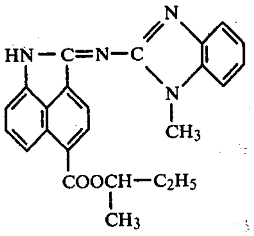 | ″ |
| 85 | 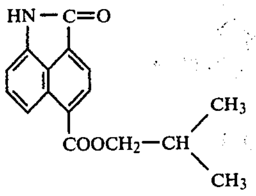 | ″ | 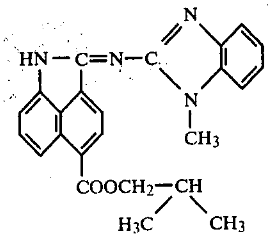 | ″ |

-continued
| No. | I Naphtholactam compounds | II Heterocyclic amines | III Dyestuffs | IV Shade on PET |
|---|---|---|---|---|
| 86 | ″ | 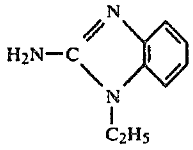 | 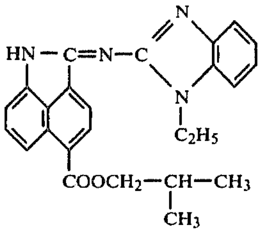 | ″ |
| 87 | 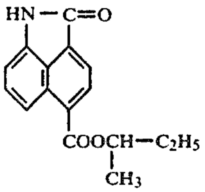 | ″ | 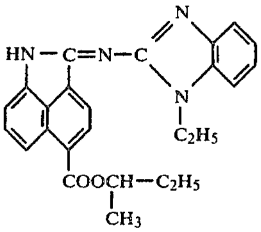 | ″ |
| 88 | 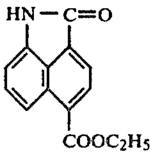 | ″ | 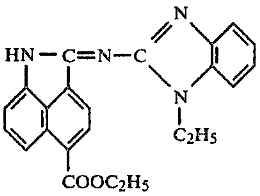 | ″ |
| 89 | ″ | 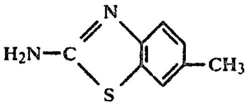 | 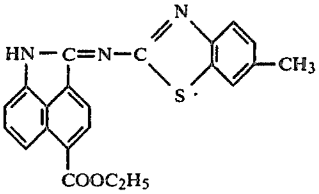 | ″ |
| 90 | 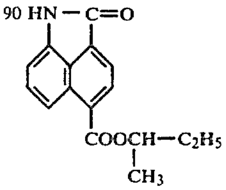 | ″ | 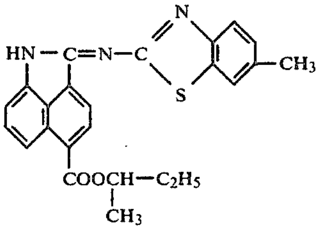 | ″ |
| 91 | 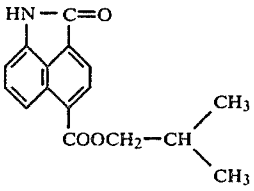 | ″ | 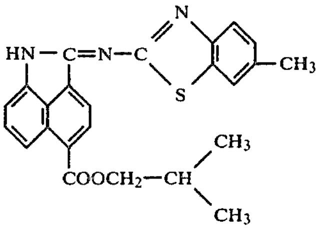 | ″ |
| 92 | ″ | 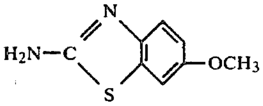 | 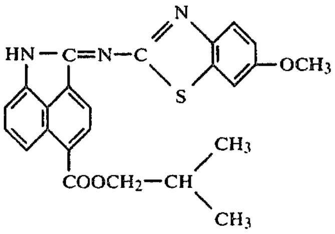 | ″ |

-continued
| No. | I Naphtholactam compounds | II Heterocyclic amines | III Dyestuffs | IV Shade on PET |
|---|---|---|---|---|
| 93 | 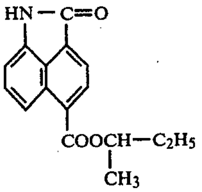 | ″ | 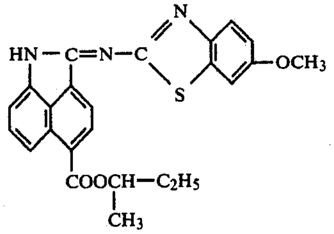 | ″ |
| 94 | 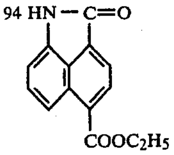 | ″ | 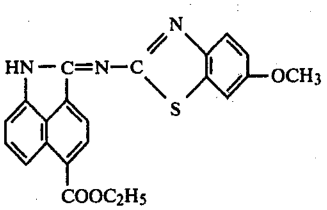 | ″ |
| 95 | 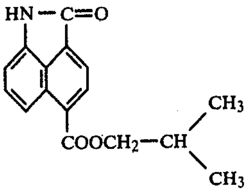 | 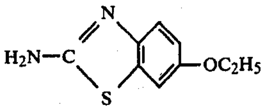 | 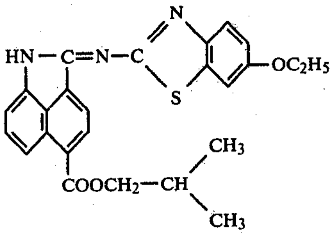 | ″ |
| 96 | ″ | 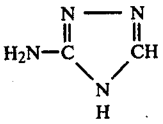 | 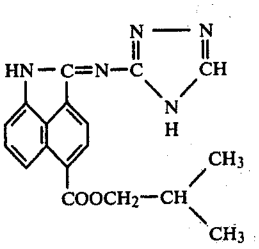 | ″ |
| 97 | 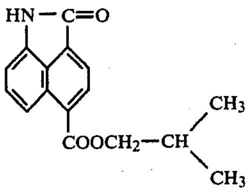 | 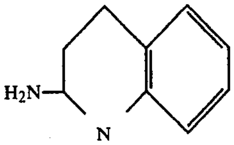 | 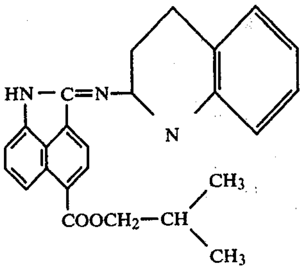 | ″ |
| 98 | ″ | 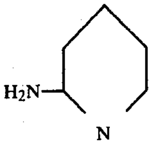 | 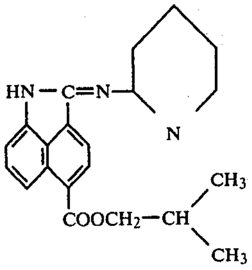 | ″ |

-continued
| No. | I Naphtholactam compounds | II Heterocyclic amines | III Dyestuffs | IV Shade on PET |
|---|---|---|---|---|
| 99 | " | 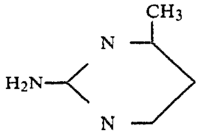 | 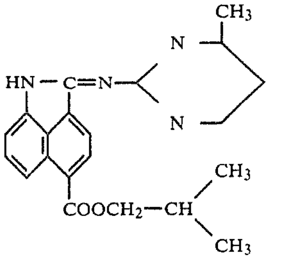 | " |
| 100 | 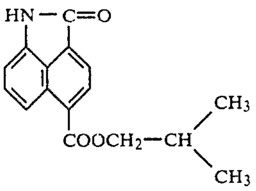 | 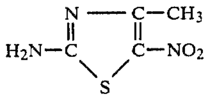 | 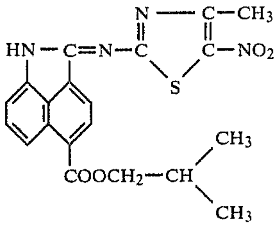 | yellow |
| 101 | 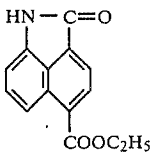 | 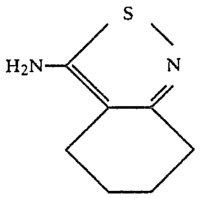 | 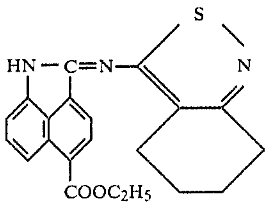 | red-dish-tinged yellow |
| 102 | 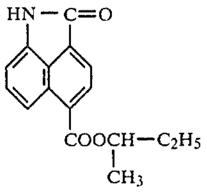 | " | 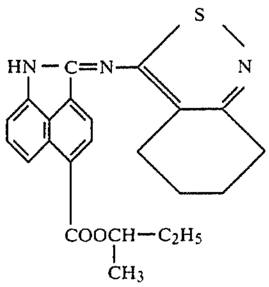 | red-dish-tinged yellow |
| 103 | 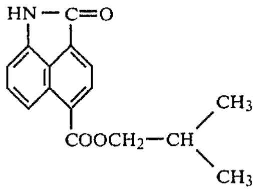 | " | 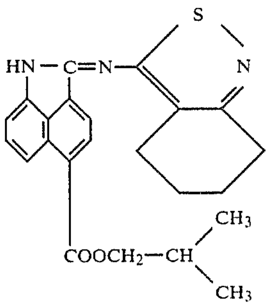 | red-dish-tinged yellow |
| 104 | " | 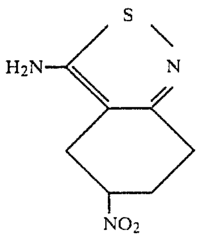 | 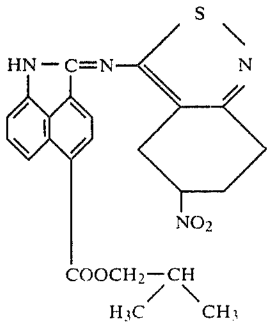 | red-dish-tinged yellow |

-continued
| No. | I Naphtholactam compounds | II Heterocyclic amines | III Dyestuffs | IV Shade on PET |
|---|---|---|---|---|
| 105 | 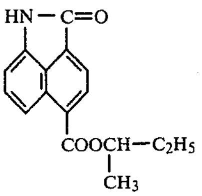 | " | 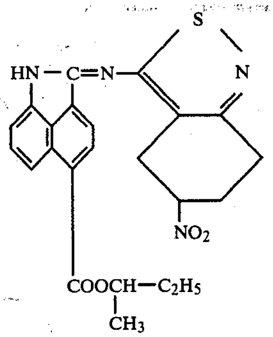 | red-dish-tinged yellow |
| 106 | 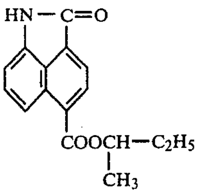 | 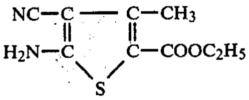 | 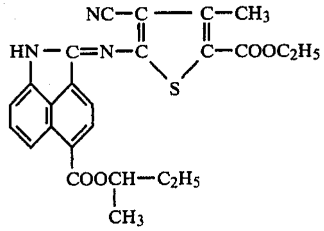 | yellow |
| 107 | 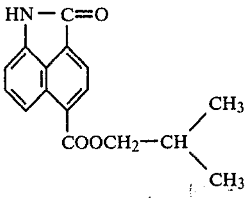 | " | 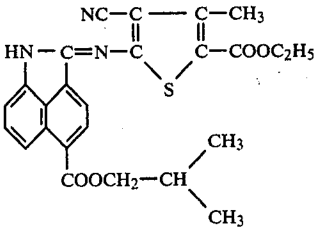 | " |
| 108 | " | 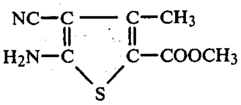 | 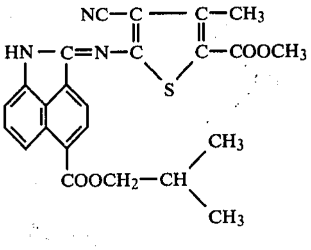 | " |
| 109 | 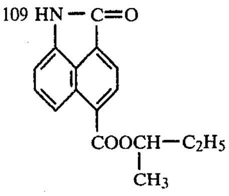 | 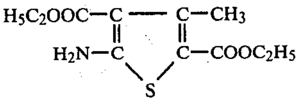 | 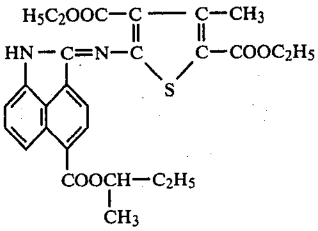 | " |
| 110 | 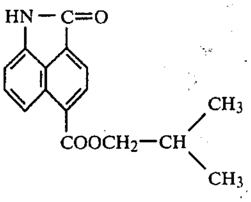 | " | 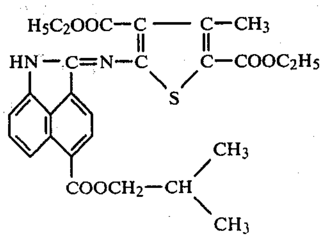 | " |

-continued
| No. | I Naphtholactam compounds | II Heterocyclic amines | III Dyestuffs | IV Shade on PET |
|---|---|---|---|---|
| 111 | ″ | 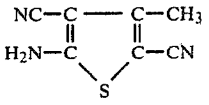 | 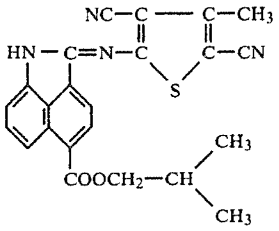 | ″ |
| 112 | ″ | 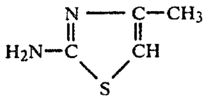 | 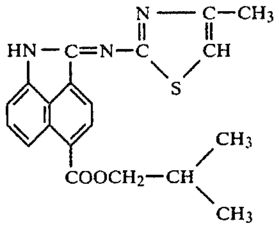 | ″ |
| 113 | 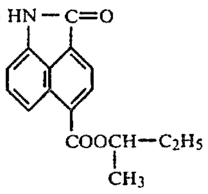 | ″ | 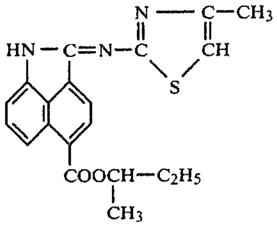 | ″ |
| 114 | 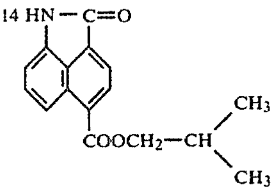 | ″ | 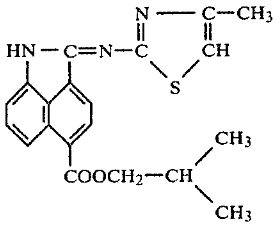 | ″ |
| 115 | ″ | 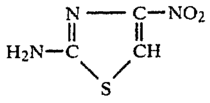 | 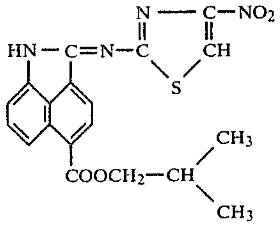 | ″ |
| 116 | ″ | 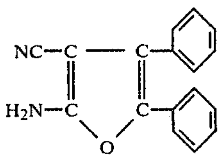 | 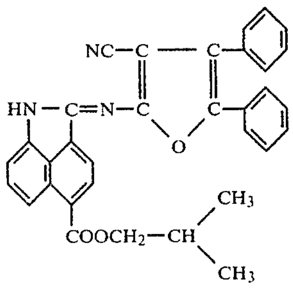 | red |

-continued
| No. | I Naphtholactam compounds | II Heterocyclic amines | III Dyestuffs | IV Shade on PET |
|---|---|---|---|---|
| 117 | 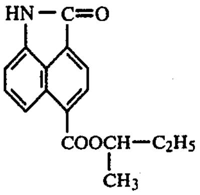 | " | 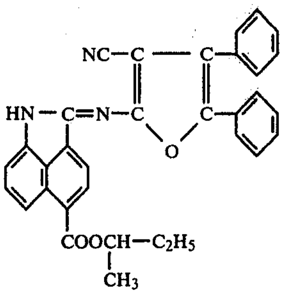 | " |
| 118 | 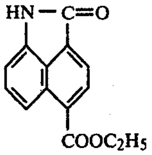 | 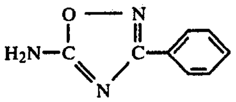 | 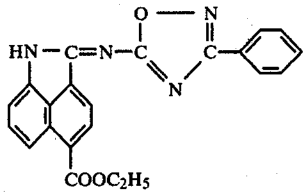 | yellow |
| 119 | 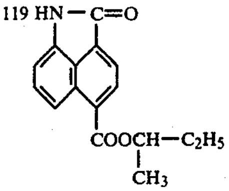 | " | 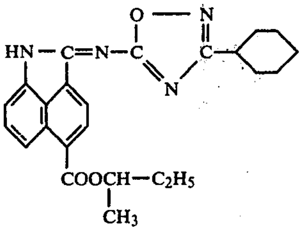 | " |
| 120 | 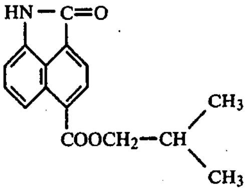 | " | 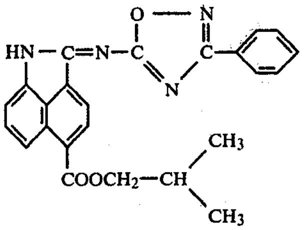 | " |
| 121 | 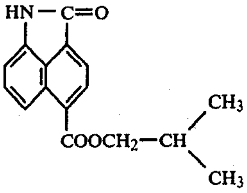 | 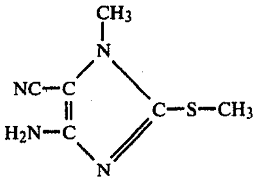 | 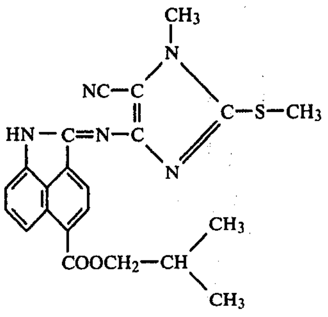 | " |
| 122 | 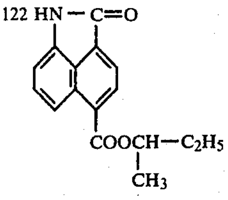 | " | 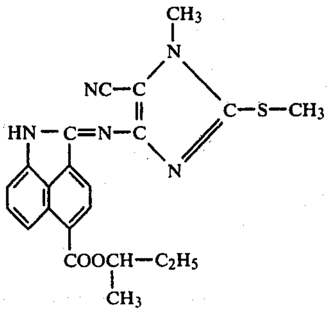 | " |

-continued

| No. | I Naphtholactam compounds | II Heterocyclic amines | III Dyestuffs | IV Shade on PET |
|---|---|---|---|---|
| 123 | 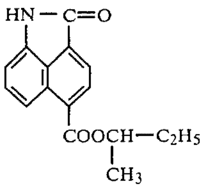 | 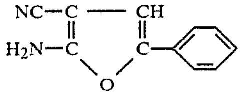 | 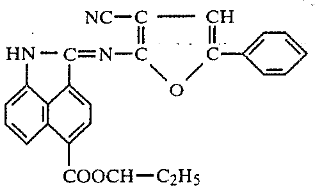 | " |
| 124 | 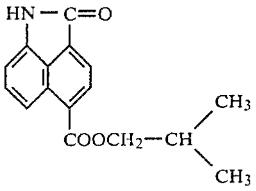 | " | 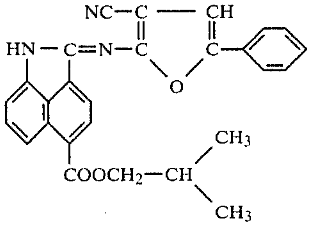 | " |
| 125 | " | 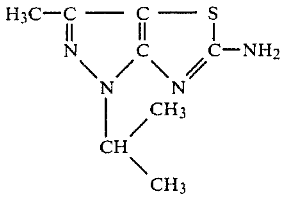 | 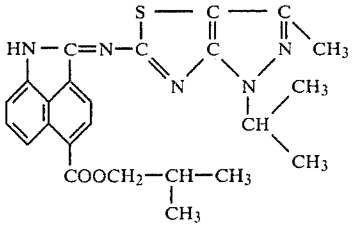 | " |
| 126 | 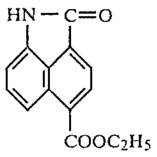 | " | 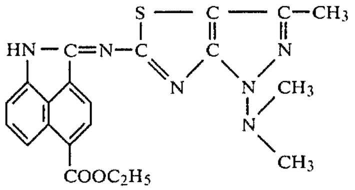 | " |
| 127 | " | 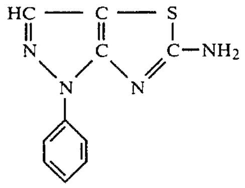 | 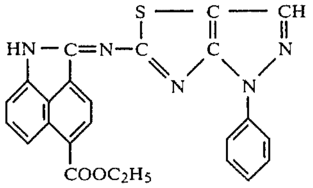 | " |
| 128 | 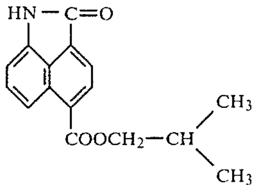 | " | 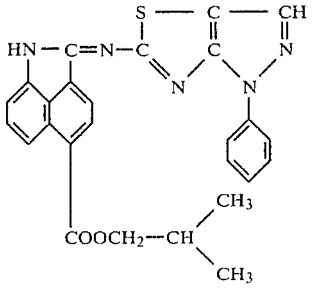 | " |

EXAMPLE 2

A mixture of 4.80 g of 5-ethoxycarbonyl-naphtholactam, 3.25 g of 2-cyano-4-nitroaniline and 30 ml of chlorobenzene is stirred at a temperature of 100° and a mixture of 2.10 ml of phosphorus oxychloride and 3 ml of chlorobenzene is allowed to run in dropwise in the course of 30 minutes, after which the mixture is stirred for a further one hour at the same temperature. After cooling, the precipitate which has formed is filtered off and, after it has been washed with chlorobenzene, is suspended in 50 ml of isopropanol. The suspension is warmed to 50° and 60 ml of a 10% strength solution of sodium bicarbonate is added to give a pH value of 8 for the mixture. The mixture is heated briefly to 70° and allowed to cool and the dyestuff of the formula

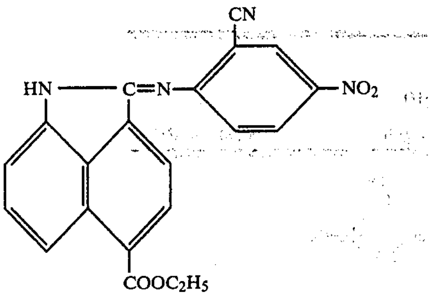

which has been liberated is isolated by filtration, washed with isopropanol and then dried at 100°.

When applied from an aqueous dispersion at 130°, the dyestuff dyes fabric made of polyethylene terephthalate brilliant yellow. The dyeings have good festness to sublimaton and light.

If, with an otherwise identical procedure, equivalent amounts of the naphtholactams listed under I in the table which follows are used in place of the naphtholactam compound indicated above and equivalent amounts of the aromatic amines listed under II are used in place of 2-cyano-4-nitroaniline, the dyestuffs indicated under III, which have similar properties, are obtained.

| No. | I Naphtholactam compounds | II Aromatic amines | III Dyestuffs | IV Shade on PET |
|---|---|---|---|---|
| 1 | 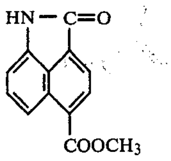 | 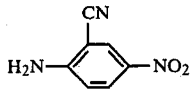 | 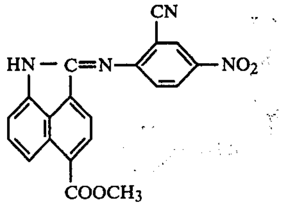 | yellow |
| 2 | 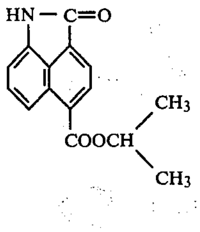 | " | 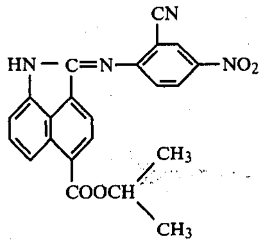 | " |
| 3 | 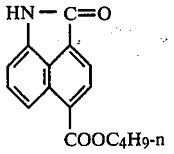 | " | 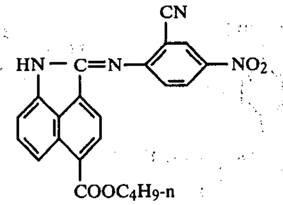 | " |
| 4 | 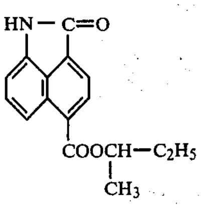 | " | 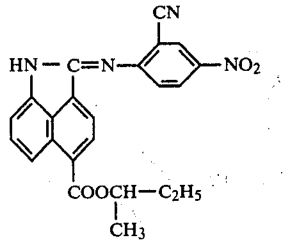 | " |
| 5 | 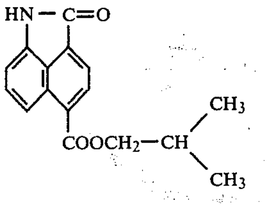 | " | 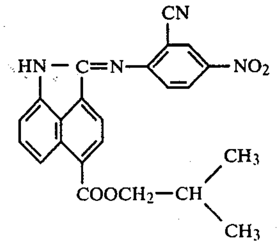 | " |

-continued
| No. | I Naphtholactam compounds | II Aromatic amines | III Dyestuffs | IV Shade on PET |
|---|---|---|---|---|
| 6 | 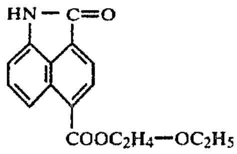 | " | 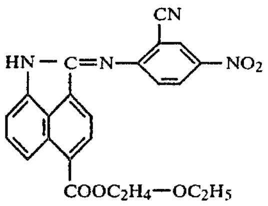 | " |
| 7 | 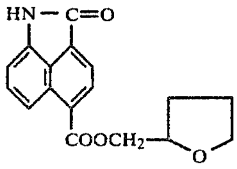 | " | 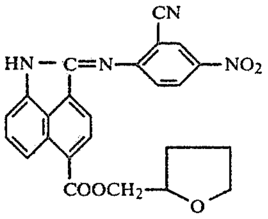 | " |
| 8 | 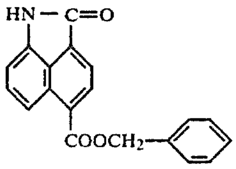 | " | 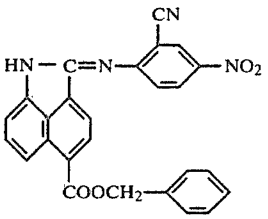 | " |
| 9 | 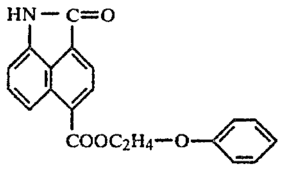 | " | 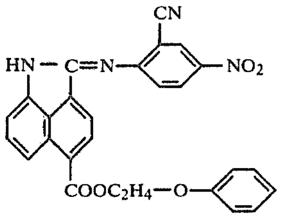 | " |
| 10 | 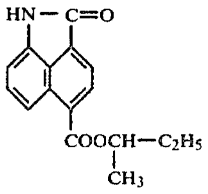 |  | 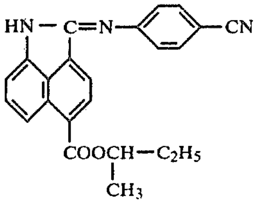 | " |
| 11 | 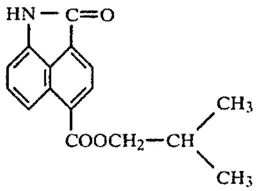 | " | 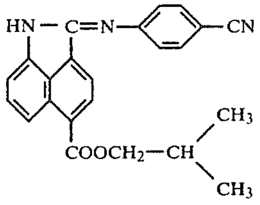 | " |
| 12 | " | 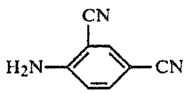 | 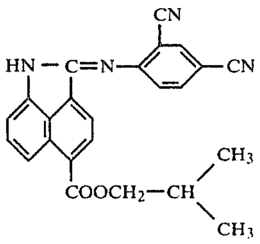 | " |

-continued
| No. | I Naphtholactam compounds | II Aromatic amines | III Dyestuffs | IV Shade on PET |
|---|---|---|---|---|
| 13 | " | 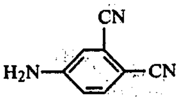 | 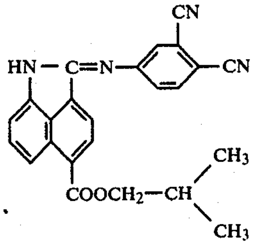 | " |
| 14 | " | 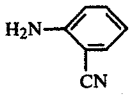 | 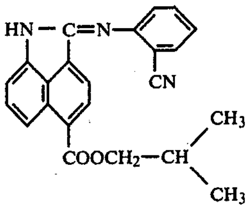 | " |
| 15 | 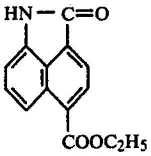 | 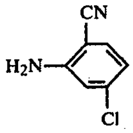 | 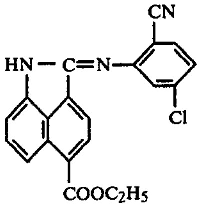 | " |
| 16 | 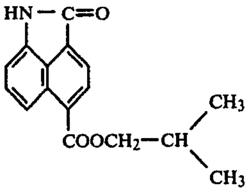 | " | 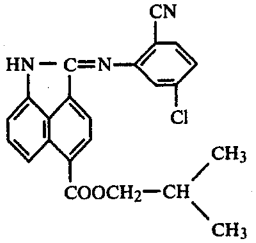 | " |
| 17 | " |  | 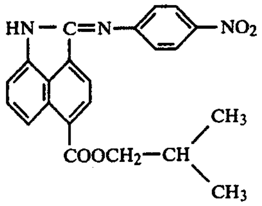 | " |
| 18 | 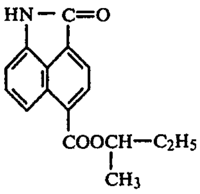 | " | 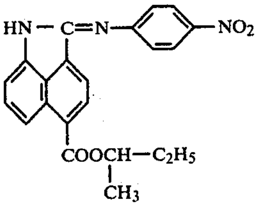 | " |
| 19 | " | 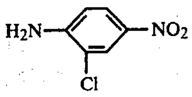 | 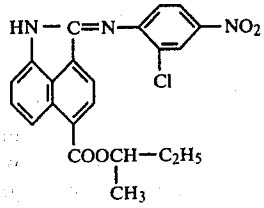 | " |

-continued

| No. | I Naphtholactam compounds | II Aromatic amines | III Dyestuffs | IV Shade on PET |
|---|---|---|---|---|
| 20 | 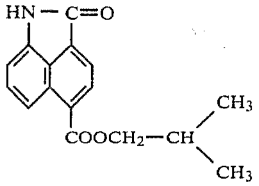 | " | 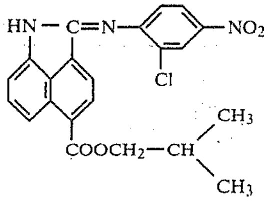 | " |
| 21 | " | 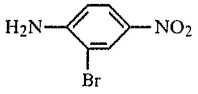 | 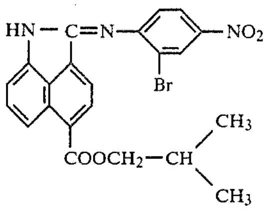 | " |
| 22 | " | 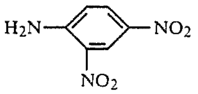 | 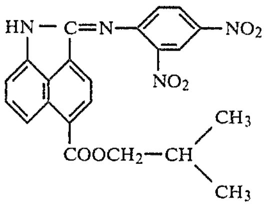 | " |
| 23 | 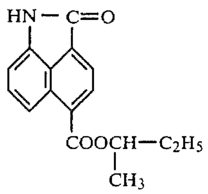 | " | 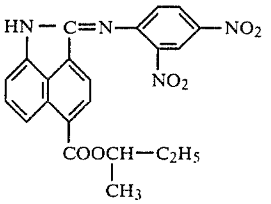 | " |

EXAMPLE 3

8.6 g of the dyestuff of the formula

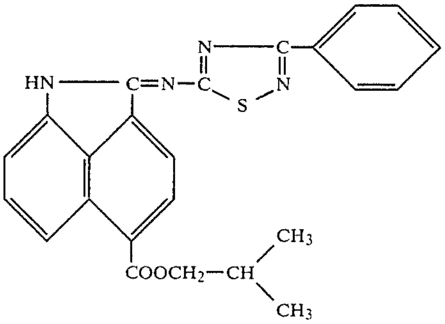

are introduced, at a temperature of 20° to 25°, into 40 ml of 8% strength oleum and the resulting solution is then stirred for 6 hours at the same temperature, after which it is poured onto a mixture consisting of 400 g of ice and 40 g of sodium chloride. The precipitate which has formed is filtered off, strong suction is applied and the material on the suction filter is then suspended in 100 ml of water. The pH value of the mixture is adjusted to 7 by adding dilute sodium hydroxide solution, the mixture is heated to 80° and a total of 20 g of sodium chloride is added in small portions. The mixture is allowed to cool to 60° and the sodium salt of the dyestuff formed is filtered off and then dried in vacuo at 100°. When applied from a weakly acid bath, this dyestuff gives brilliant yellow dyeings on synthetic polyamide.

If equivalent amounts of the dyestuffs of the above table are used in place of the dyestuff employed above, dyestuffs with similar properties are obtained.

EXAMPLE 4

2 g of the dyestuff obtained according to Example 1 are dispersed in 4,000 g of water. 12 g of the sodium salt of o-phenylphenol, as a swelling agent, and 12 g of diammonium phosphate are added to this dispersion and 100 g of a yarn made of polyethylene glycol terephthalate are dyed for 1½ hours at 95° to 98°. The dyeing is rinsed and after-treated with aqueous sodium hydroxide solution and a dispersing agent.

This gives a reddish-tinged yellow dyeing which is fast to washing, light and sublimation.

If, in the above example, the 100 g of polyethylene glycol terephthalate yarn are replaced by 100 g of cellulose triacetate fabric, dyeing is carried out under the indicated conditions and the dyeing is then rinsed with water, a reddish-tinged yellow dyeing which has very good fastness to washing and sublimation is obtained.

EXAMPLE 5

2 g of the dyestuff obtained according to Example 1 are finely suspended in 2,000 g of water which contains 4 g of oleylpolyglycol ether, in a pressure-dyeing machine. The pH value of the dye bath is adjusted to 4 to 5 with acetic acid.

100 g of a fabric made of polyethylene glycol terephthalate are now introduced at 50°, the bath is heated to 140° in the course of 30 minutes and dyeing is carried out for 50 minutes at this temperature. The dyeing is then rinsed with water, soaped and dried. When these conditions are maintained, a reddish-tinged yellow dyeing which is fast to washing, perspiration, light and sublimation is obtained.

The dyestuffs described in the other examples give dyeings of equal quality by this process.

If, in the above example, the 10 g of polyethylene glycol terephthalate yarn are replaced by 100 g of cellulose triacetate yarn, dyeing is carried out under the indicated conditions and the dyeing is then rinsed with water, a reddish-tinged yellow dyeing which has very good fastness to light and sublimation is obtained.

EXAMPLE 6

Polyethylene glycol terephthalate fabric is impregnated, on a padder, at 40° with a liquor of the following composition: 20 g of the dyestuff obtained according to Example 1, finely dispersed in 7.5 g of sodium alginate, 20 g of triethanolamine, 20 g of octylphenol polyglycol ether and 900 g of water.

The fabric, which is squeezed off to about 100%, is dried at 100° and then set for 30 seconds at a temperature of 210°. The dyed goods are rinsed with water, soaped and dried. Under these conditions a reddish-tinged yellow dyeing which is fast to washing, rubbing, light and sublimation is obtained.

The dyestuffs described in the other examples give dyeings of equal quality by this process.

EXAMPLE 7

100 g of "Banlon" ® tricot (a polyamide fabric) are introduced at 40° into a dyebath which contains 1 g of the dyestuff obtained according to Example 3 and 3 ml of 85% strength fermic acid in 5,000 ml of water. Whilst agitating well, the bath is heated to the boil in the course of 30 minutes and dyeing is carried out for one hour at the boil. The dyed goods are then carefully rinsed and dried. A clear, brilliant, yellow dyeing of good tinctorial strength is obtained.

EXAMPLE 8

100 g of wool which has been pre-wetted well are introduced at 50° into a dyebath which contains 1 g of the dyestuff obtained according to Example 3, 5 g of sodium sulphate and 3 ml of 40% strength acetic acid in 5,000 ml of water, the bath is heated to the boil in the course of 15 minutes and dyeing is carried out for one hour at the boil. A clear, brilliant yellow dyeing is obtained.

We claim:

1. A dyestuff of the formula (I)

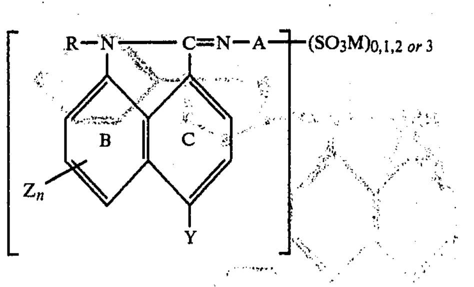

(I)

in which R represents $C_1$–$C_4$-alkyl, $C_1$–$C_5$-alkenyl, $C_4$–$C_9$-cycloalkyl, $C_7$–$C_9$-phenyl-alkyl, phenyl or hydrogen, M represents hydrogen or a cation, Y represents —COCl, —COBr, a free carboxyl group or a $C_1$–$C_4$-alkyl ester thereof, Z is $C_1$–$C_4$-alkoxy, Cl, Br, $NO_2$, phenylsulphonyl, cyano, $CONH_2$, CONH-$C_1$–$C_4$-alkyl, and CON($C_1$–$C_4$-alkyl)$_2$, n represents 0, 1 or 2, A represents a heterocyclic radical of the benzimidazole, benzoxazole, benzthiadiazole, thiazole, pyridine, quinoline, phenanthridine, indolenine, thiadiazole, oxadiazle, imidazole, furane, triazole, pyrimidine or isoquinoline series.

2. A dyestuff according to claim 1, wherein Y represents —COCl, COBr or —CO—OR$_1$', in which R$_1$' is $C_1$–$C_{16}$-alkyl, $C_1$–$C_9$-alkenyl, $C_6$–$C_9$-cycloalkyl, $C_6$–$C_9$-phenyl-alkyl, or phenyl and A and R have the same meaning as above.

3. A dyestuff according to claim 2, wherein Y represents a group of the formulae —CO—Or$_1$' in which R$_1$' is the same as in claim 2.

4. A dyestuff according to claim 2, wherein Y represents the group —CO—halogen, in which "halogen" denotes chlorine or bromine.

5. A dyestuff according to claim 3 of the formula

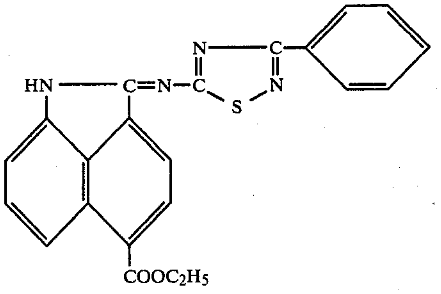

6. A dyestuff according to claim 2 of the formula

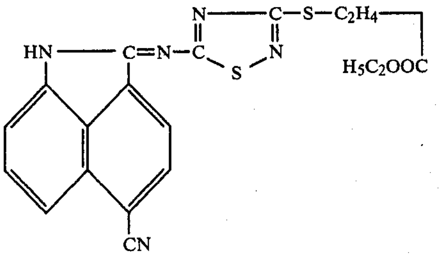

7. A dyestuff according to claim 2 of the formula

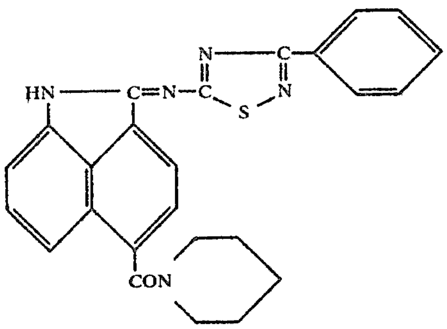
8. A dyestuff according to claim 2 of the formula
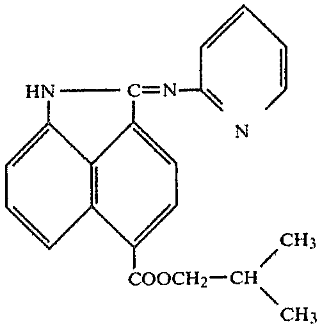
* * * * *

UNITED STATES PATENT AND TRADEMARK OFFICE

CERTIFICATE OF CORRECTION

PATENT NO. : 4,236,007

DATED : November 25, 1980

INVENTOR(S) : Hansrudolf Schwander et al.

It is certified that error appears in the above—identified patent and that said Letters Patent is hereby corrected as shown below:

Column 1, line 15, "Z" broken letter.

Column 2, line 61, "chloro" not "bromo".

Column 3, line 4, "1-amino-2,4-dicyano" not "1-amino-2,"

Column 9, line 19, "ethine" not "ethane".

Column 9, line 43, "diphenyl".

Column 10, line 16, "1,4" not "14".

Column 27, No. 30: "$COOC_2H_4$" (I - omit one C).

Column 38, No. 69: "$COOC_4H_9$-n" not "$C_2$".

Column 54, No. 119, III, should be 

Column 58, line 5, "fastness" misspelled.

Column 65, line 49 "formic" not "fermic".

Signed and Sealed this

*Fourteenth* Day of *April 1981*

[SEAL]

*Attest:*

RENE D. TEGTMEYER

*Attesting Officer* *Acting Commissioner of Patents and Trademarks*